United States Patent
Kitamura et al.

(10) Patent No.: US 10,752,113 B2
(45) Date of Patent: Aug. 25, 2020

(54) VEHICLE DISPLAY APPARATUS AND VEHICLE

(71) Applicant: Mazda Motor Corporation, Aki-gun, Hiroshima (JP)

(72) Inventors: Yo Kitamura, Hiroshima (JP); Hado Morokawa, Hiroshima (JP); Seiji Hisada, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 0 days.

(21) Appl. No.: 16/490,675

(22) PCT Filed: Feb. 27, 2018

(86) PCT No.: PCT/JP2018/007270
§ 371 (c)(1),
(2) Date: Sep. 3, 2019

(87) PCT Pub. No.: WO2018/173652
PCT Pub. Date: Sep. 27, 2018

(65) Prior Publication Data
US 2020/0001718 A1    Jan. 2, 2020

(30) Foreign Application Priority Data

Mar. 24, 2017  (JP) ................ 2017-059622

(51) Int. Cl.
*B60K 37/02* (2006.01)
*B60K 35/00* (2006.01)
*B60R 1/12* (2006.01)

(52) U.S. Cl.
CPC .............. *B60K 37/02* (2013.01); *B60K 35/00* (2013.01); *B60K 2370/154* (2019.05)

(58) Field of Classification Search
CPC .................................................... B60K 37/02
See application file for complete search history.

(56) References Cited

U.S. PATENT DOCUMENTS

2005/0212669 A1   9/2005  Ono et al.
2014/0062688 A1   3/2014  Aoki et al.
(Continued)

FOREIGN PATENT DOCUMENTS

EP       2033831 A1    3/2009
JP    2005241626 A    9/2005
(Continued)

OTHER PUBLICATIONS

European Patent Office, Extended European Search Report Issued in Application No. 18770895.3, dated Feb. 19, 2020, Germany, 7 pages.

*Primary Examiner* — Joseph H Feild
*Assistant Examiner* — Pameshanand Mahase
(74) *Attorney, Agent, or Firm* — Alleman Hall Creasman & Tuttle LLP

(57) ABSTRACT

Present application discloses display apparatus including: display panel having display surface to display image; and overlaid member overlaid on display surface. Overlaid member partitions display surface into inner region at least partially surrounded by overlaid member, and outer region situated outside overlaid member. Image contains inner and outer images displayed in inner and outer regions. Display panel includes signal generator for generating first image signal for changing content of the inner image displayed in inner region in response to first switching signal outputted from first switch. Signal generator generates second image signal for changing content of the outer image displayed in outer region in response to second switching signal outputted from second switch which is more distant from steering wheel than first switch.

19 Claims, 17 Drawing Sheets

(56) References Cited

U.S. PATENT DOCUMENTS

| | | | | |
|---|---|---|---|---|
| 2014/0327537 A1* | 11/2014 | Nagasaka | ............... | B60K 35/00 |
| | | | | 340/462 |
| 2014/0333663 A1* | 11/2014 | Yamada | ................. | G09G 5/377 |
| | | | | 345/629 |
| 2017/0129336 A1* | 5/2017 | Hisada | .................... | B60K 35/00 |
| 2018/0215264 A1* | 8/2018 | Shoji | ...................... | B60K 37/02 |

FOREIGN PATENT DOCUMENTS

| | | | |
|---|---|---|---|
| JP | 2013178783 | A | 9/2013 |
| JP | 2014094615 | A | 5/2014 |
| JP | 2016114423 | A | 6/2016 |
| JP | 2017039392 | A | 2/2017 |
| WO | 03057522 | A1 | 7/2003 |

* cited by examiner

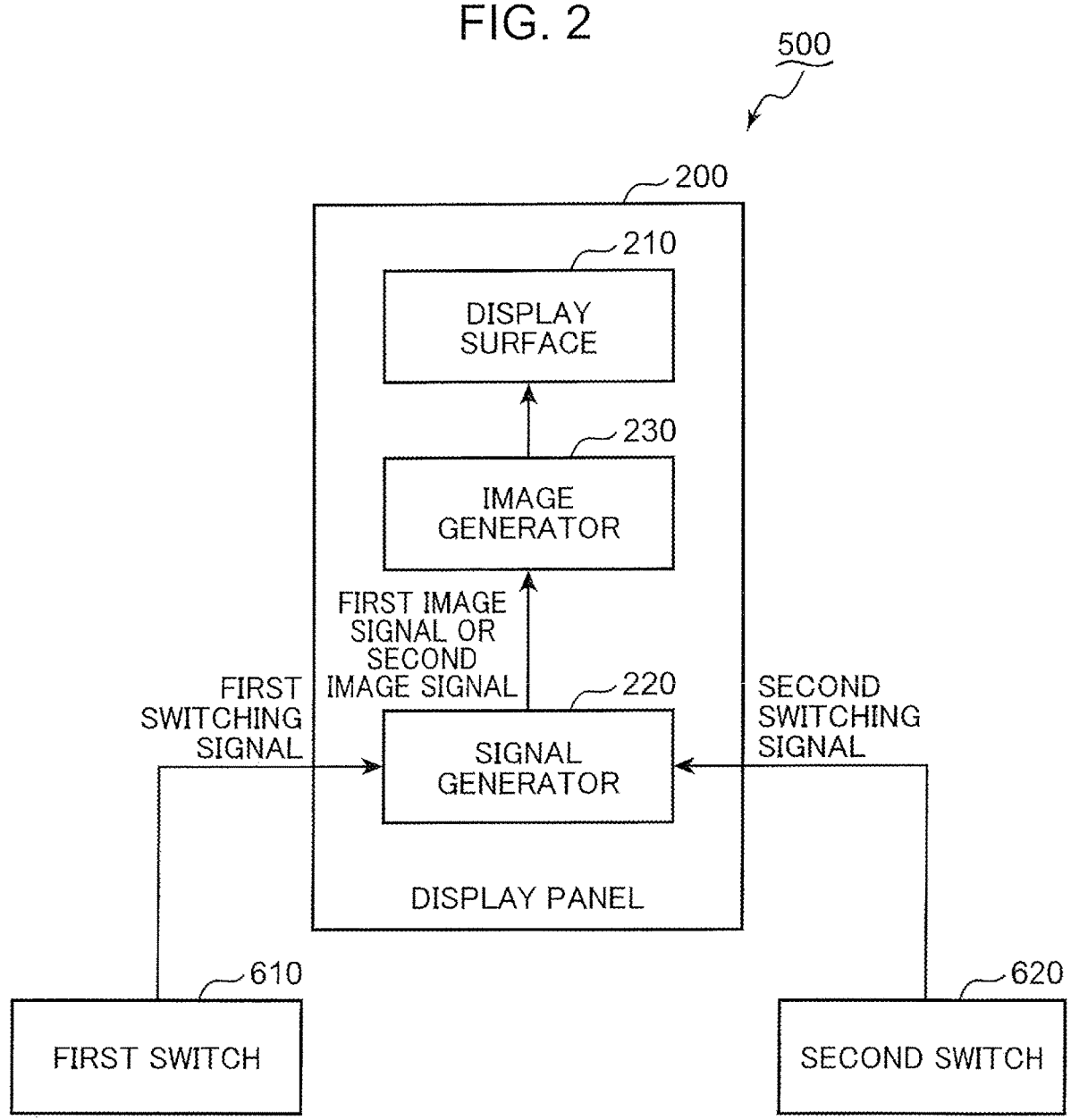

FIG. 9

| FIRST DATA | SECOND DATA | CONTENT OF INFORMATION |
|---|---|---|
| IMAGE INFORMATION A1 | — | TRAVELING DISTANCE |
| IMAGE INFORMATION B1 | IMAGE INFORMATION B2 | AVERAGE FUEL CONSUMPTION |
| — | IMAGE INFORMATION C2 | INSTANTANEOUS FUEL CONSUMPTION |
| IMAGE INFORMATION D1 | IMAGE INFORMATION D2 | TRAVELING DIRECTION |
| IMAGE INFORMATION E1 | IMAGE INFORMATION E2 | TRAVELABLE DISTANCE |
| IMAGE INFORMATION F1 | — | PRECEDING VEHICLE (AUTOMATIC CRUISING CONTROL) |
| IMAGE INFORMATION G1 | — | SET VEHICLE SPEED (AUTOMATIC CRUISING CONTROL) |
| IMAGE INFORMATION H1 | — | PERIOD UNTIL POINT OF TIME AT WHICH INSPECTION IS REQUIRED |
| IMAGE INFORMATION I1 | — | DISTANCE FOR DISTANCE AT WHICH INSPECTION IS REQUIRED |

VEHICLE DISPLAY APPARATUS AND VEHICLE

TECHNICAL FIELD

The present invention relates to a vehicle display apparatus provided with a display panel and a vehicle.

BACKGROUND ART

Analogue meters having rotary needles have been often used for giving information which indicates traveling states of vehicles to drivers. Recently, it has been attempted to replace the analogue meters with a display panel configured to display images of traveling states of a vehicle (c.f. Patent Document 1). Unlike the analogue meters, the display panel may give a variety of information to a driver.

A display apparatus disclosed in Patent Document 1 detects gestures of a driver to display images in correspondence to the gestures. Accordingly, the driver may change images without directly touching the display apparatus.

According to the techniques disclosed in Patent Document 1, the driver has to memorize various gestures for displaying desired images. Accordingly, the techniques disclosed in Patent Document 1 require the driver to perform a lot of memorizing operations for associating the gestures with the images. In addition, the display apparatus disclosed in Patent Document 1 requires sensors for detecting the gestures of the driver. Accordingly, the display apparatus becomes expensive.

DOCUMENT LIST

Patent Document

Patent Document 1: JP 2013-178783 A

SUMMARY OF INVENTION

It is an object of the present invention to provide inexpensive techniques which allow a driver to easily perform an operation for changing images.

A vehicle display apparatus according to one aspect of the present invention includes: a display panel having a display surface on which an image is displayed; and an overlaid member overlaid on the display surface. The overlaid member partitions the display surface into an inner region which is at least partially surrounded by the overlaid member, and an outer region which is situated outside the overlaid member. The image contains an inner image displayed in the inner region and an outer image displayed in the outer region. The display panel includes a signal generator configured to generate a first image signal for changing a content of the inner image displayed in the inner region in response to a first switching signal outputted from a first switch. The signal generator generates a second image signal for changing a content of the outer image displayed in the outer region in response to a second switching signal outputted from a second switch which is more distant from a steering wheel than the first switch.

A vehicle according to another aspect of the present invention includes the aforementioned vehicle display apparatus.

The aforementioned techniques allow a driver to easily perform an operation of changing images, and enable to manufacture the vehicle display apparatus and the vehicle at low costs.

Objects, features and advantageous effects of the present invention will become more apparent by the detailed description of the invention made hereinafter and attached drawings.

BRIEF DESCRIPTION OF DRAWINGS

FIG. 2 is a schematic block diagram of a vehicle into which the vehicle display apparatus of FIG. 1 is incorporated.

FIG. 9 is a conceptual view of data stored in a storage of the vehicle of FIG. 8.

DESCRIPTION OF EMBODIMENTS

First Embodiment

A display panel gives a variety of information to a driver. The information given by the display panel is classified into information for which frequent changes of display contents are required by the driver and information for which a continuous display is required by the driver. When display contents is changed by a switch near a steering wheel, the driver may switch the display contents frequently and safely. Even when information for which the frequent changes of display contents are not required is switched by a switch which is distant from the steering wheel, the driver is less likely to feel inconvenience. Rather, the driver may operate the switch near the steering wheel to quickly make a display panel display desired information since there is the switch which is different from the switch near the steering. A vehicle display apparatus allowing the changes of display contents by the switches is described in the first embodiment.

Figure 1:
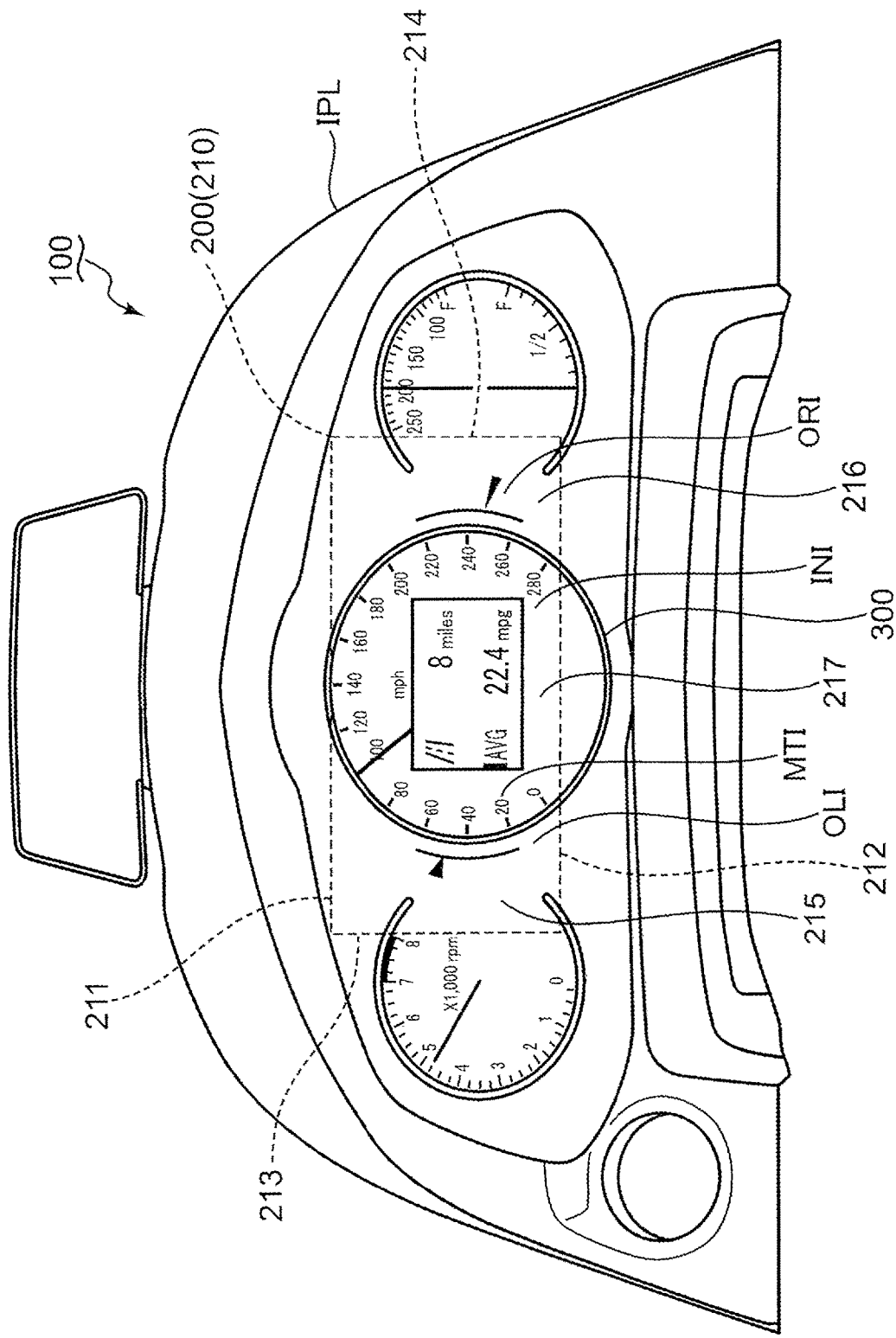
FIG. 1 is a schematic front view of a vehicle display apparatus according to the first embodiment.

FIG. 1 is a schematic front view of the vehicle display apparatus (hereinafter referred to as "display apparatus 100") of the first embodiment. The display apparatus 100 is described with reference to FIG. 1.

The display apparatus 100 includes a display panel 200 and a ring frame 300. The display panel 200 in FIG. 1 includes a display surface 210 and a housing (not shown) which supports the display surface 210. A rectangular frame indicated by a dotted line in FIG. 1 means the display surface 210. Various images are displayed on the display surface 210. Various electronic components and optical components for displaying images are stored in the housing. The housing is fixed in a space surrounded by an instrument panel IPL of the vehicle. Accordingly, a user (a driver or a passenger) may visually recognize the display surface 210 without visually recognizing the housing. The display panel 200 may be mounted on the instrument panel IPL so that the driver may view the display surface 210 over a steering wheel (not shown). The display panel 200 may be a liquid crystal display configured to display an image by driving liquid crystals. Alternatively, the display panel 200 may be a plasma display with plasma light emission. Further alternatively, the display panel 200 may be an organic EL display with organic EL (electro luminescence) elements. The principles of the present embodiment are not limited to a particular type of display panels 200.

The display surface 210 includes an upper edge 211, a lower edge 212, a left edge 213 and a right edge 214. The upper edge 211 extends substantially horizontally. The lower edge 212 extends substantially horizontally below the upper edge 211. The left edge 213 extends between the left ends of the upper and lower edges 211, 212. The right edge 214 extends between the right ends of the upper and lower edges 211, 212. Various images are displayed in a region surrounded by the upper and lower edges 211, the left and right edges 213, 214.

The ring frame 300 is a substantially annular member overlaid on the display surface 210. With regard to the present embodiment, the overlaid member is exemplified by the ring frame 300. However, the overlaid member may be polygonal or elliptical. The principles of the present embodiment are not limited to a particular shape of the overlaid member.

There is the center of the ring frame 300 below the center of the display surface 210. A straight line which connects the centers of the ring frame 300 and the display surface 210 is substantially in parallel to the left and right edges 213, 214. Accordingly, there is the ring frame 300 substantially at the center of the display surface 210 in the horizontal direction. However, the overlaid member may be overlaid on the display surface 210 so that the center of the overlaid member is closer to the left edge 213 than the right edge 214 of the display surface 210. Alternatively, the overlaid member may be overlaid on the display surface 210 so that the center of the overlaid member is closer to the right edge 214 than the left edge 213 of the display surface 210. Accordingly, the principles of the present embodiment are not limited to a particular position of the overlaid member on the display surface 210.

A meter image MTI indicating a traveling speed of the vehicle is displayed in a region surrounded by the ring frame 300. The meter image MTI is always displayed on the display surface 210 while the display panel 200 is operated. The meter image MTI contains images of numerals indicating a vehicle speed. The images of the numerals are displayed substantially at regular intervals along the ring frame 300. In addition, the meter image MTI also contains images of scale lines drawn as short lines extending toward the images of the numerals from an inner edge of the ring frame 300. The images of the scale lines are displayed substantially at regular intervals along the ring frame 300. The display panel 200 displays an image of a meter needle on the display surface 210 in addition to the images of the numerals and the scale lines. The positions of the images of the numerals and the scale lines are fixed whereas a display position of the image of the meter needle on the display panel 200 is changed in correspondence to a traveling speed. Accordingly, the display position of the image of the meter needle is changed along the ring frame 300 so that a user may know a current speed of the vehicle. An image displayed as the meter image MTI may be other display formats to inform a user of a speed of the vehicle. For example, the image of the scale line and/or the image of the numeral in correspondence to a current traveling speed of the vehicle may be illuminated. Accordingly, the principles of the present embodiment are not limited to a particular design of an image which is displayed as the meter image MTI.

The ring frame 300 largely protrudes from the lower edge 212 of the display surface 210. The meter image MTI is not displayed in the region below the lower edge 212. However, the user may receive visual impression that the meter image MTI is displayed in a wide region since the user is likely to recognize the region surrounded by the ring frame 300 as a region in which the meter image MTI is displayed.

The ring frame 300 is formed from a non-transmissive (i.e. opaque) material (c.f. metal). Accordingly, the user may visually recognize the ring frame 300 certainly. Therefore, in cooperation with the meter image MTI, the ring frame 300 may give the user a visual impression similar to a general analogue meter. Consequently, the display apparatus 100 may have a design which is well acceptable to a user.

The upper edge 211 of the display surface 210 is substantially coincident to a tangent line at the uppermost point of the inner circumference of the ring frame 300, so that the ring frame 300 protrudes from the upper edge 211 of the display surface 210 by the thickness of the ring frame 300. Accordingly, the display panel 200 may use a region from the lower limit position (i.e. the lower edge 212) to the upper limit position (i.e. the upper edge 211) in a region surrounded by the ring frame 300 for displaying the meter image MTI. Therefore, a designer designing the display apparatus 100 may give the meter image MTI a large display size.

The display surface 210 is divided into a left region 215, a right region 216 and a center region 217 by the ring frame 300. The left region 215 is a region which protrudes leftward from the ring frame 300. The right region 216 is a region which protrudes rightward from the ring frame 300. The center region 217 is a region surrounded by the ring frame 300 and the lower edge 212. The aforementioned meter image MTI is displayed in the center region 217. With regard to the present embodiment, the inner region is exemplified by the center region 217. The outer region is exemplified by at least one of the left and right regions 215, 216.

With regard to the present embodiment, the center region 217 exemplified as the inner region is partially surrounded by the ring frame 300 exemplified as the overlaid member. However, the inner region may be a region completely surrounded by the overlaid member when the overlaid member completely fit in the display surface 210.

The display panel 200 displays an inner image INI in the center region 217 in addition to the meter image MTI. The inner image INI is surrounded by the meter image MTI displayed along the inner edge of the ring frame 300. Unlike the meter image MTI, the driver may change information represented by the inner image INI to other information.

The display panel 200 further displays outer images OLI, ORI. The outer image OLI is displayed in the left region 215. The outer image ORI is displayed in the right region 216. Like the inner image INI, the driver may change information represented by the outer images OLI, ORI to other information. With regard to the present embodiment, the image is exemplified by the meter image MTI, the inner image INI and the outer images OLI, ORI.

FIG. 2 is a schematic block diagram of a vehicle 500. The vehicle 500 is described with reference to FIGS. 1 and 2.

The vehicle 500 includes the aforementioned display panel 200. The vehicle 500 further includes a first switch 610 and a second switch 620. The driver may operate the first switch 610 to change contents of the inner image INI. The driver may operate the second switch 620 to change contents of the outer images OLI, ORI.

There is the first switch 610 near the steering wheel (not shown). The first switch 610 may be a steering switch mounted on the steering wheel, or a switching element situated at a position so that the driver may access the switching element without taking the hand off the steering wheel. Since the driver may operate the first switch 610 without taking the hand off the steering wheel, the driver may safely change contents of the inner image INI. Accordingly, the driver may frequently change contents of the inner image INI.

The second switch 620 is more distant from the steering wheel than the first switch 610. The second switch 620 may be a panel switch mounted on the instrument panel IPL. The second switch 620 may be a switch mounted on the display panel 200. The second switch 620 may be a switch mounted on a portion other than the instrument panel IPL, the display panel 200 and the steering wheel (e.g. a door or a roof). The driver has to take the hand off the steering wheel to operate the second switch 620. Accordingly, it is preferable that the outer images OLI, ORI have contents for which a continuous display is desired by the driver, display contents of the outer images OLI, ORI being changed by operating the second switch.

Each of the first and second switches 610, 620 may be a button, a lever or a dial. The principles of the present embodiment are not limited to a particular structure of a switching element used as each of the first and second switches 610, 620.

The display panel 200 includes a signal generator 220 and an image generator 230 in addition to the aforementioned display surface 210. When the driver operates the first switch 610, the first switch 610 generates a first switching signal. The first switching signal is outputted from the first switch 610 to the signal generator 220. The signal generator 220 which has received the first switching signal generates a first image signal to change contents of the inner image INI. The first image signal is outputted from the signal generator 220 to the image generator 230. When the driver operates the second switch 620, the second switch 620 generates a second switching signal. The second switching signal is outputted from the second switch 620 to the signal generator 220. The signal generator 220 which has received the second switching signal generates a second image signal to change contents of at least one of the outer images OLI, ORI. The second image signal is outputted from the signal generator 220 to the image generator 230.

The image generator 230 may be a drive circuit configured to drive elements (e.g. a liquid crystal layer or an organic EL layer) which forms the display surface 210. Drive techniques used in a general display panel are applicable to the image generator 230. The principles of the present embodiment are not limited to a particular structure of the image generator 230.

The image generator 230 which has received the first image signal from the signal generator 220 generates an image to change contents of the inner image INI. The image generator 230 which has received the second image signal from the signal generator 220 generates an image to change contents of at least one of the outer images OLI, ORI.

<Other Features>

A designer may apply various features to the aforementioned vehicle display apparatus. The principles of the vehicle display apparatus described in context of the aforementioned embodiment are not at all limited by the following features.

(Exemplary Inner Images)

Various images may be displayed as the inner image INI. Exemplary images to be displayed as the inner image INI are described below.

FIGS. 3A to 3D are schematic views of various images to be displayed as the inner image INI. Various images to be displayed as the inner image INI are described with reference to FIGS. 3A to 3D.

Figure 3A:
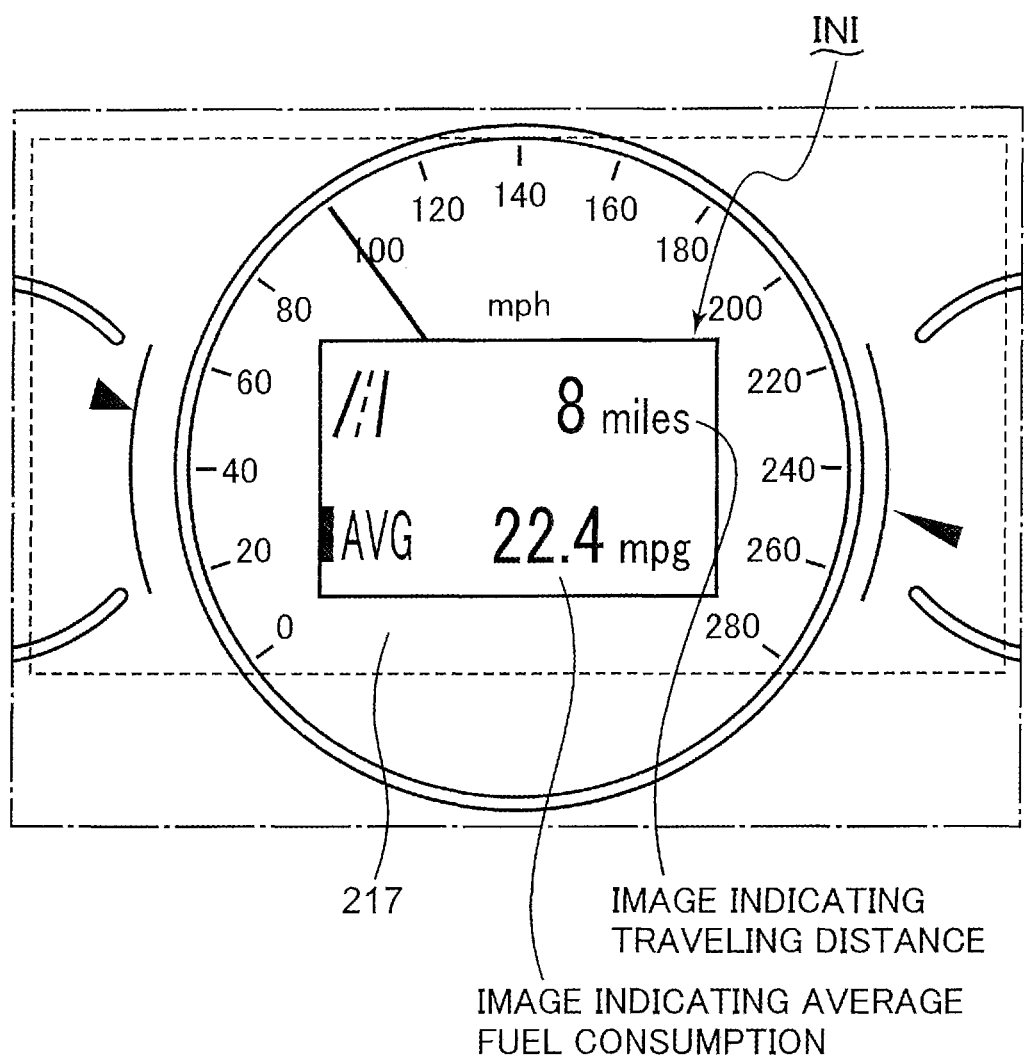
FIG. 3A is a schematic view of an image to be displayed as an inner image.

With regard to FIG. 3A, images indicating a traveling distance and an average fuel consumption are displayed in the center region 217 as the inner image INI. With regard to FIG. 3B, images indicating a traveling direction and a travelable distance (a distance which the vehicle may travel using a concurrently remaining fuel) are displayed in the center region 217 as the inner image INI. With regard to FIG. 3C, an image indicating whether or not there is a preceding vehicle as a target under an automatic cruising control and an image indicating a vehicle speed set in the automatic cruising control are displayed in the center region 217 as the inner image INI. With regard to FIG. 3D, an image indicating a period until a point of time when an inspection of the vehicle is required and an image indicating how long traveling distance is left for the inspection of the vehicle are displayed in the center region 217 as the internal image INI.

Figure 3B:
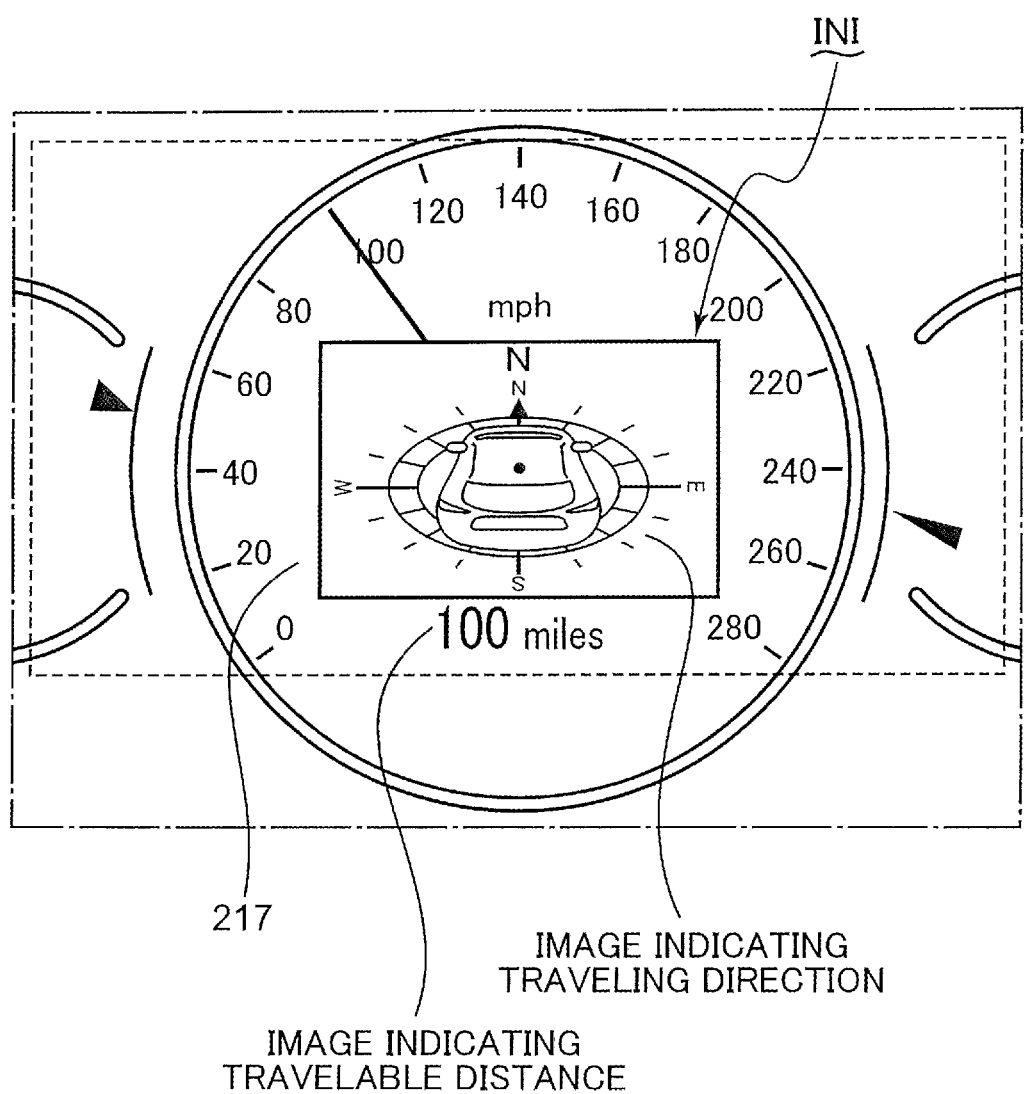
FIG. 3B is a schematic view of an image to be displayed as the inner image.
Figure 3C:
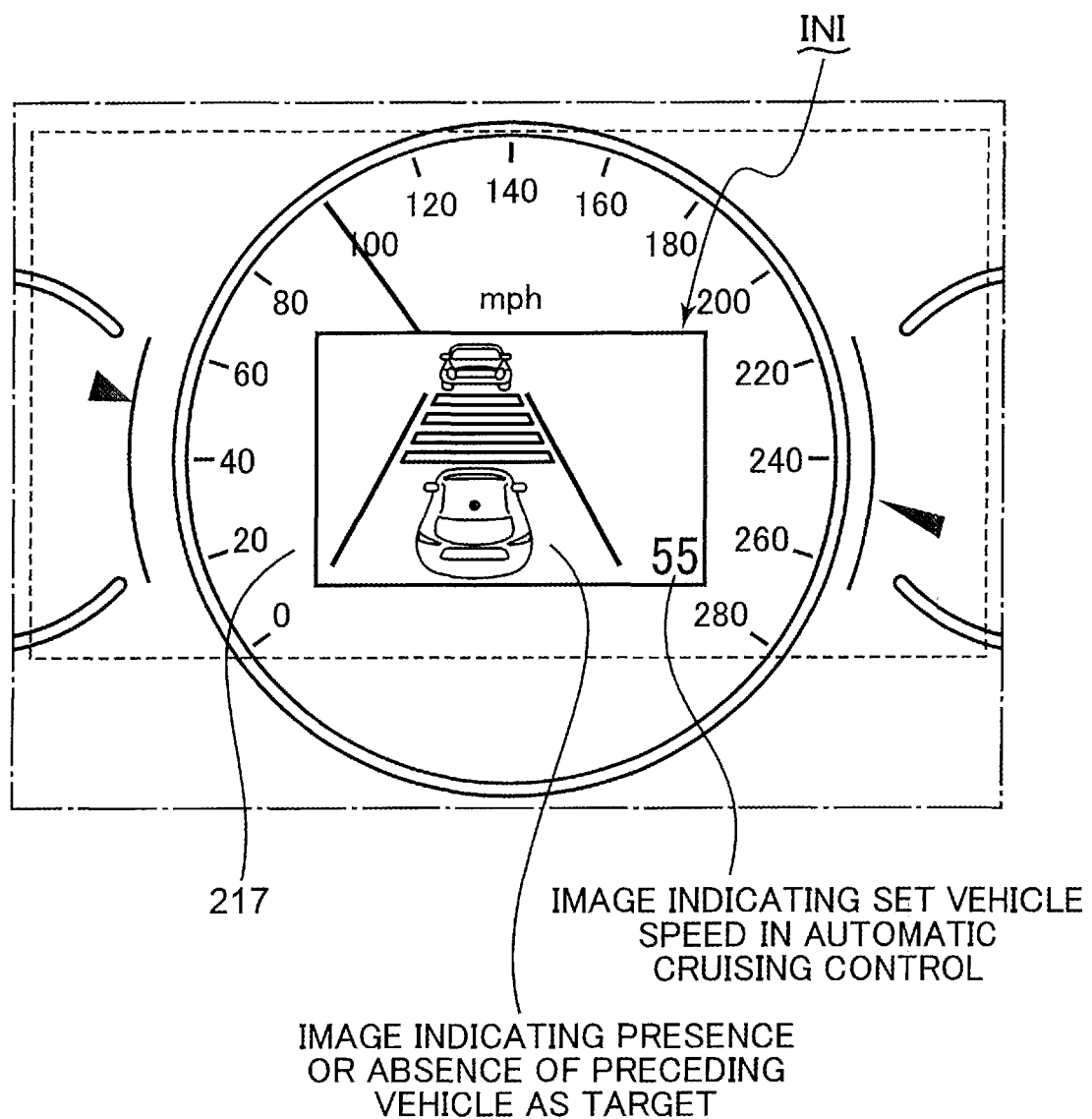
FIG. 3C is a schematic view of an image to be displayed as the inner image.
Figure 3D:
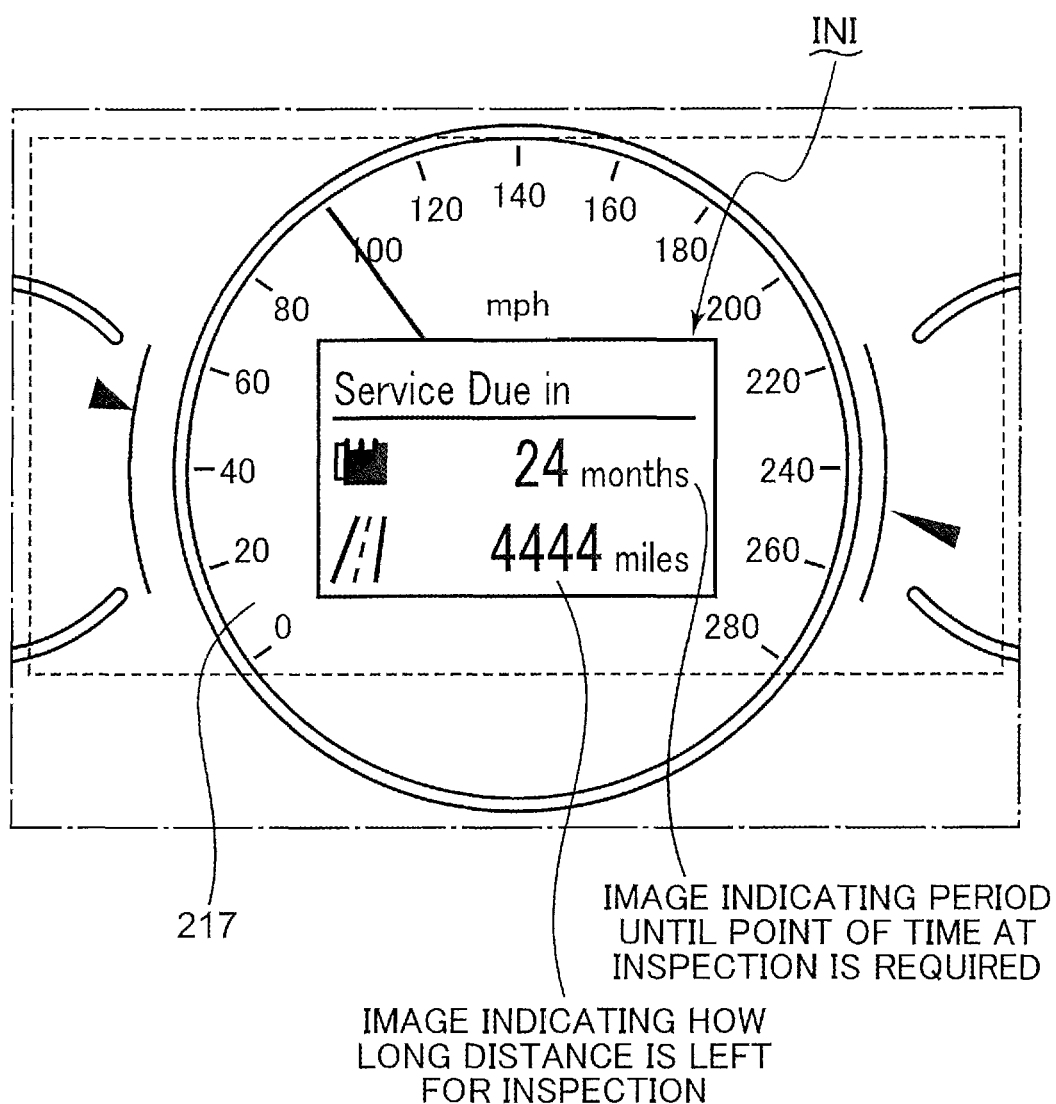
FIG. 3D is a schematic view of an image to be displayed as the inner image.
Figure 4:
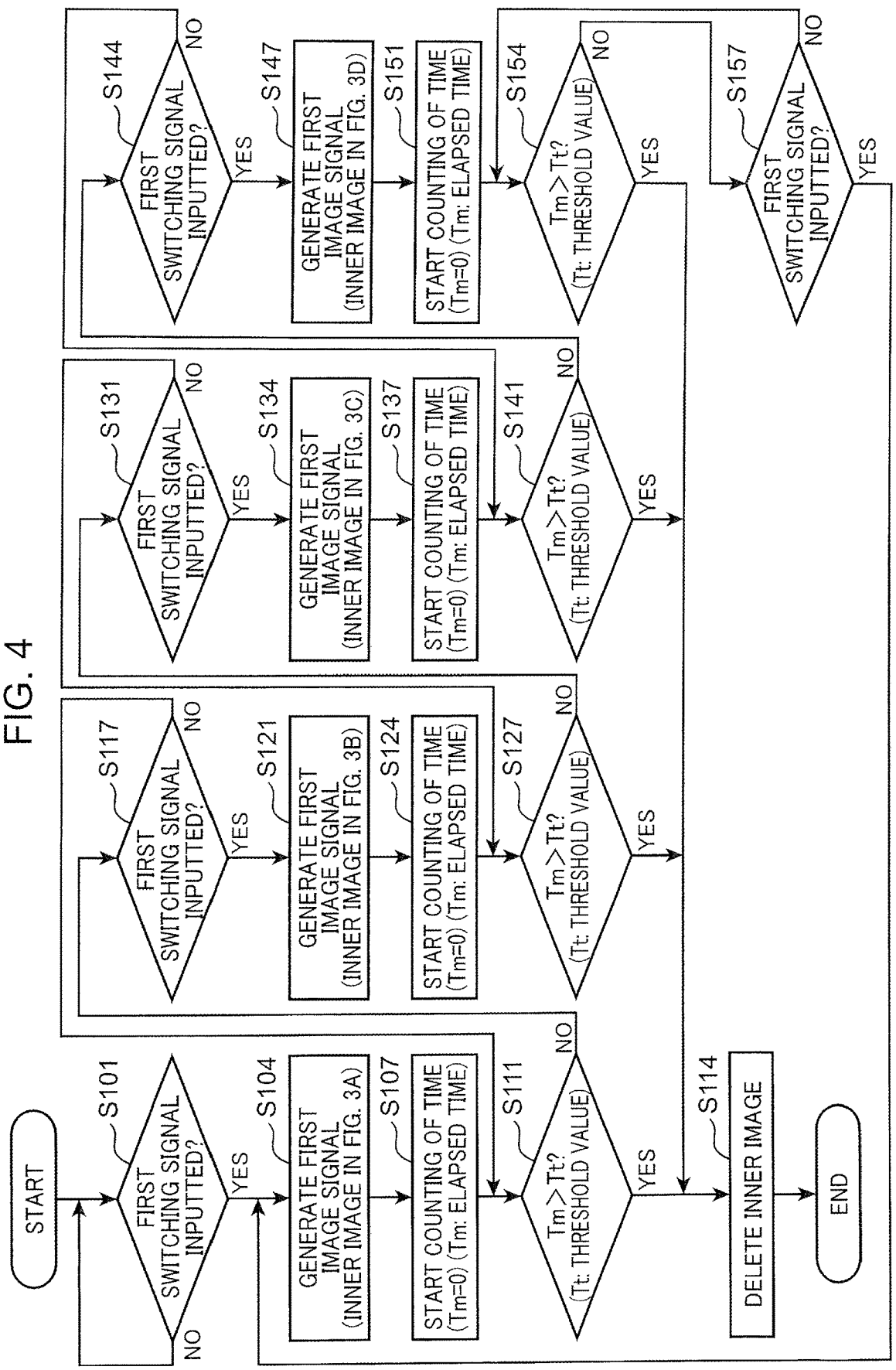
FIG. 4 is a schematic flowchart showing processes performed by a signal generator of the vehicle display apparatus shown in FIG. 1 upon reception of a first switching signal.

FIG. 4 is a schematic flowchart showing processes performed by the signal generator 220 which has received a first switching signal. The processes performed by the signal generator 220 are described with reference to FIGS. 2 to 4.

(Step S101)

The signal generator 220 waits for a first switching signal. When the signal generator 220 receives the first switching signal from the first switch 610, step S104 is performed.

(Step S104)

The signal generator 220 generates a first image signal for displaying the inner image INI shown in FIG. 3A. Then, step S107 is performed.

(Step S107)

The signal generator 220 starts counting of time (elapsed time "Tm"=0). Then, step S111 is performed.

(Step S111)

The signal generator 220 compares an elapsed time "Tm" from step S107 with a threshold value "Tt". When the elapsed time "Tm" exceeds the threshold value "Tt", step S114 is performed. Otherwise, step S117 is performed.

(Step S114)

The signal generator 220 generates an image signal so as to delete the inner image INI from the center region 217, and ends the signal processes for displaying the inner image INI.

(Step S117)

When the signal generator 220 receives the first switching signal again, step S121 is performed. Otherwise, step S111 is performed.

(Step S121)

The signal generator 220 generates a first image signal for displaying the inner image INI shown in FIG. 3B. Then, step S124 is performed.

(Step S124)

The signal generator 220 resets the elapsed time "Tm". Accordingly, the elapsed time "Tm" takes a value "0". Then, the signal generator 220 restarts counting of time. After the counting of time is restarted, step S127 is performed.

(Step S127)

The signal generator 220 compares an elapsed time "Tm" from step S124 with the threshold value "Tt". When the elapsed time "Tm" exceeds the threshold value "Tt", step S114 is performed. Otherwise, step S131 is performed.

(Step S131)

When the signal generator 220 receives the first switching signal again, step S134 is performed. Otherwise, step S127 is performed.

(Step S134)

The signal generator 220 generates a first image signal for displaying the inner image INI shown in FIG. 3C. Then, step S137 is performed.

(Step S137)

The signal generator 220 resets the elapsed time "Tm". Accordingly, the elapsed time "Tm" takes a value "0". Then, the signal generator 220 restarts counting of time. After the counting of time is restarted, step S141 is performed.

(Step S141)

The signal generator 220 compares an elapsed time "Tm" from step S137 with the threshold value "Tt". When the elapsed time "Tm" exceeds the threshold value "Tt", step S114 is performed. Otherwise, step S144 is performed.

(Step S144)

When the signal generator 220 receives the first switching signal again, step S147 is performed. Otherwise, step S141 is performed.

(Step S147)

The signal generator 220 generates a first image signal for displaying the inner image INI shown in FIG. 3D. Then, step S151 is performed.

(Step S151)

The signal generator 220 resets the elapsed time "Tm". Accordingly, the elapsed time "Tm" takes a value "0". Then, the signal generator 220 restarts counting of time. After the counting of time is restarted, step S154 is performed.

(Step S154)

The signal generator 220 compares an elapsed time "Tm" from step S151 with the threshold value "Tt". When the elapsed time "Tm" exceeds the threshold value "Tt", step S114 is performed. Otherwise, step S157 is performed.

(Step S157)

When the signal generator 220 receives the first switching signal again, step S104 is performed. Otherwise, step S154 is performed.

As a result of the processes shown in FIG. 4, the inner images INI shown in FIGS. 3A to 3D are sequentially switched whenever the driver operates the first switch 610.

Figure 5:
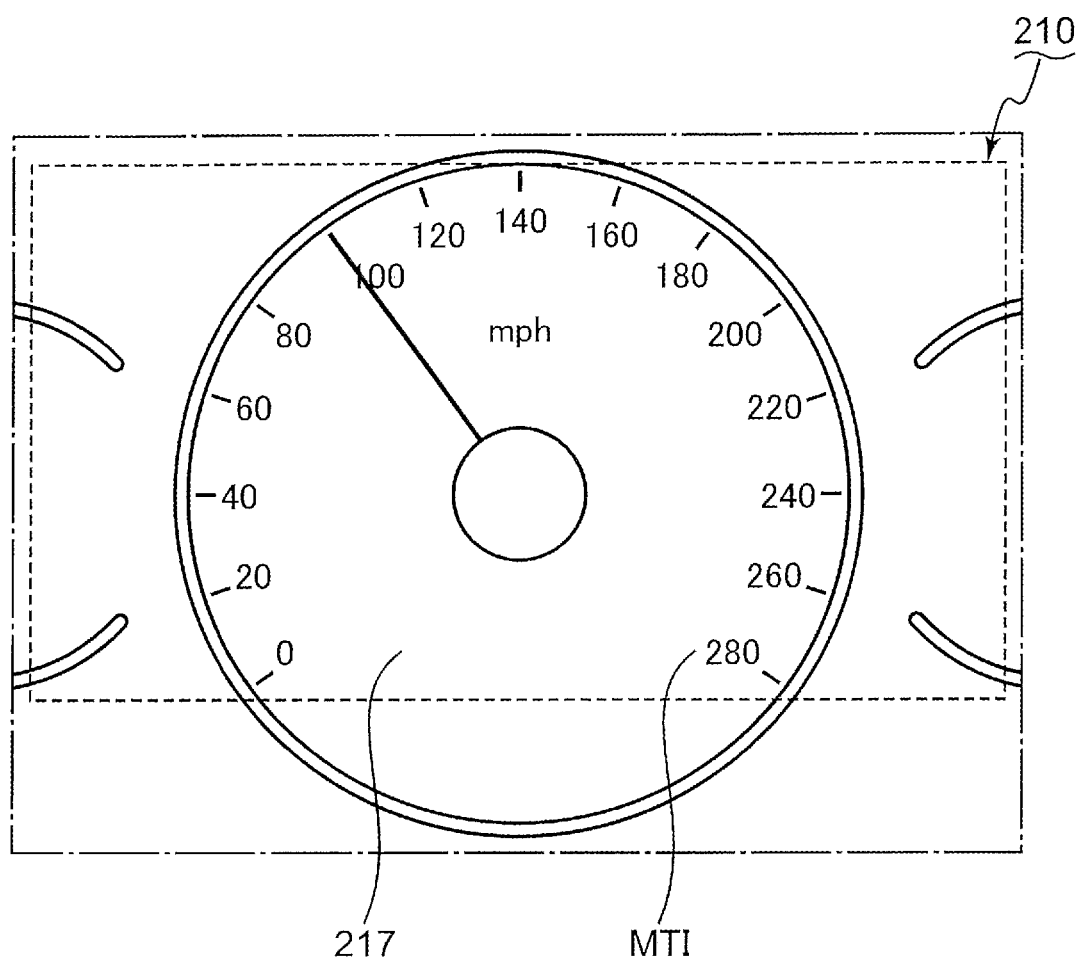
FIG. 5 is a schematic view of a display surface when step S114 in the flowchart of FIG. 4 is performed.

FIG. 5 is a schematic view of the display surface 210 when step S114 is performed. An image on the display surface 210 when step S114 is performed is described with reference to FIGS. 2 to 5.

According to the processes shown in FIG. 4, when the driver does not operate the first switch 610 for a period determined by the threshold value "Tt", step S114 described with reference to FIG. 4 is performed. As a result of performing step S114, as shown in FIG. 5, the inner images INI (c.f. FIGS. 3A to 3D) are deleted from the center region 217. Accordingly, only the meter image MTI is displayed in the center region 217. The threshold value "Tt" is set so that the driver is given a period long enough to confirm the inner image INI displayed in the center region 217.

(Exemplary Outer Images)

Various images may be displayed as the outer images OLI, ORI. Exemplary images to be displayed as the outer images OLI, ORI are described below.

Figure 6A:
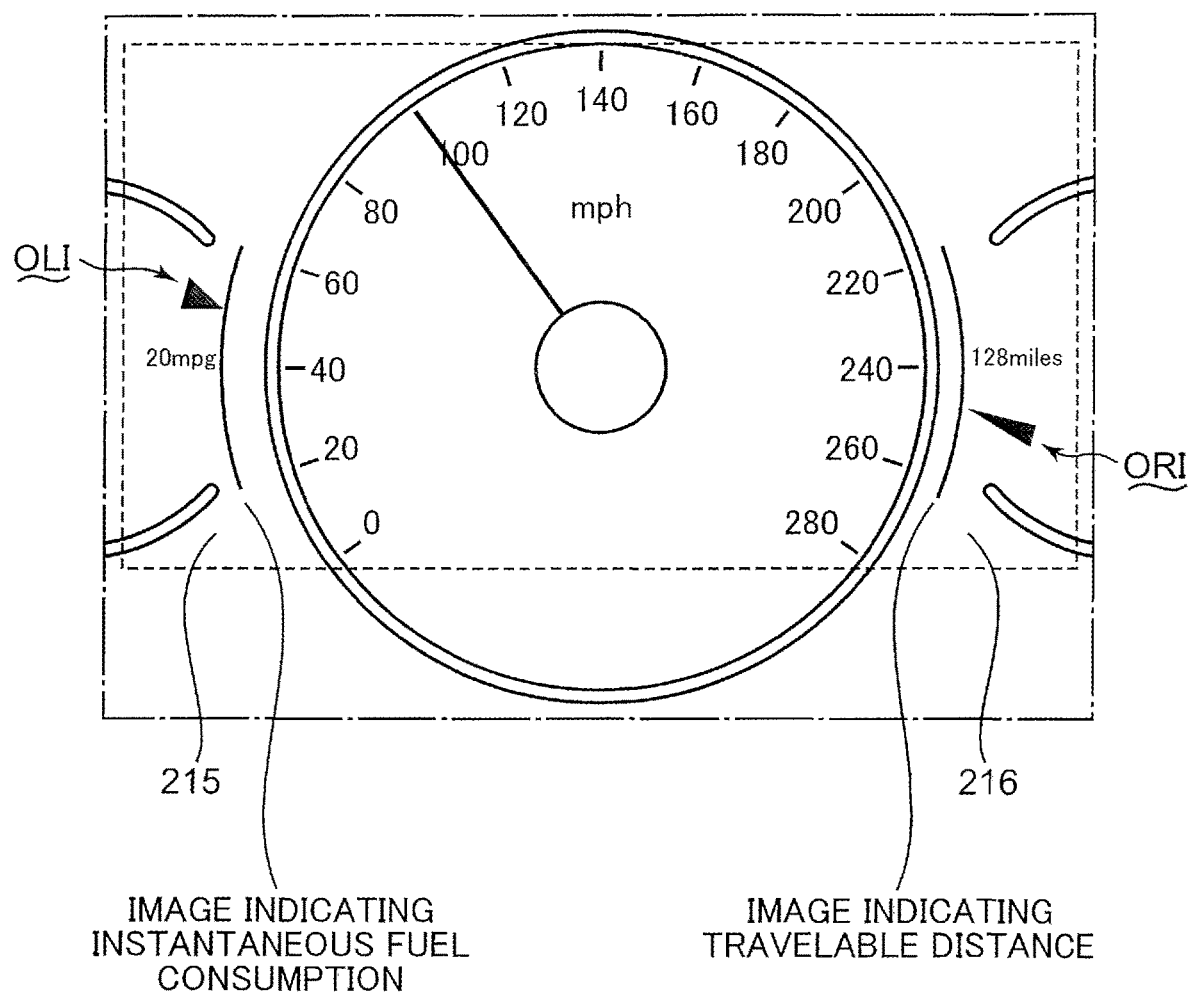
FIG. 6A is a schematic view of an image to be displayed as an outer image.
Figure 6B:
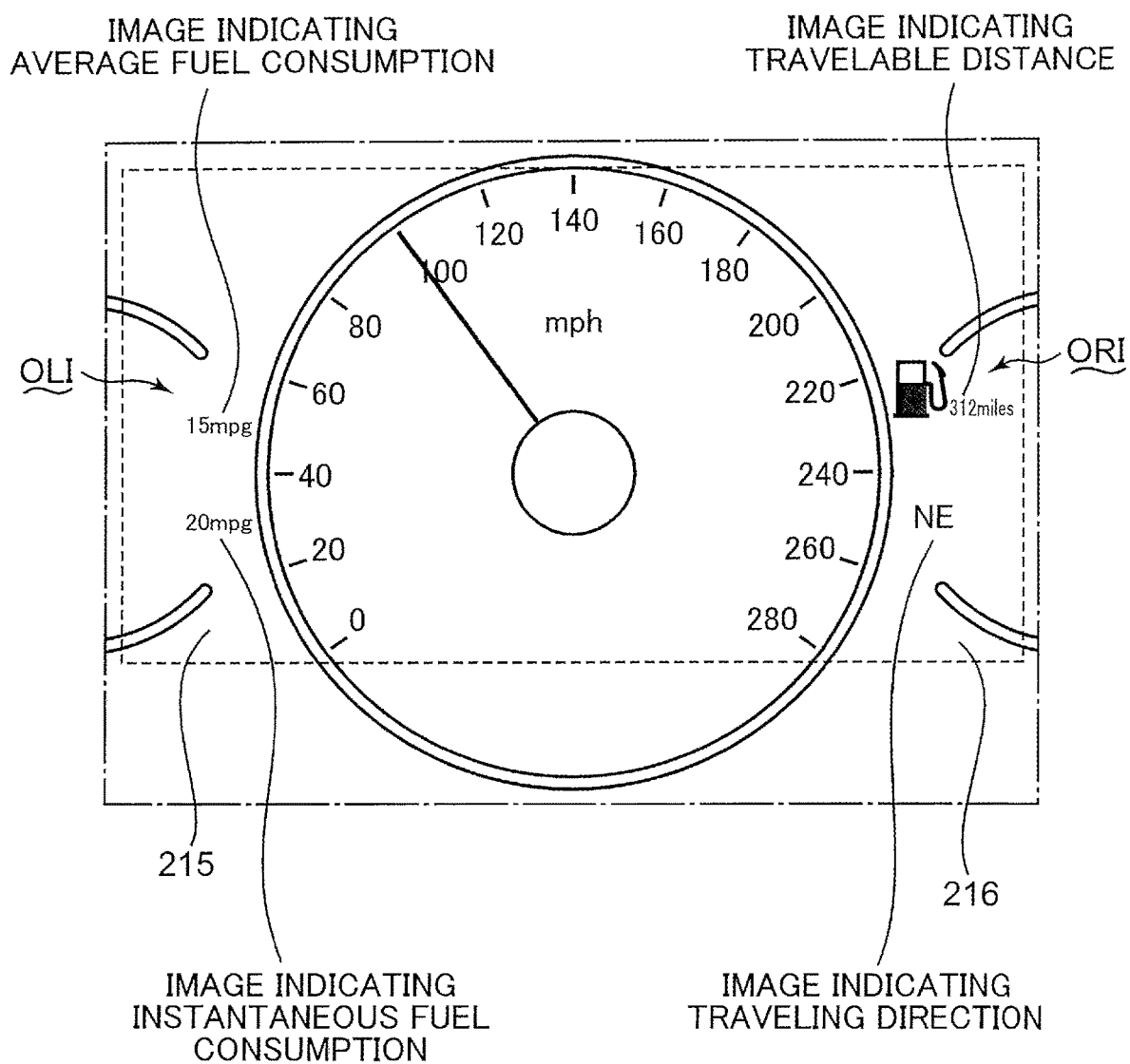
FIG. 6B is a schematic view of an image to be displayed as the outer image.

FIGS. 6A and 6B are schematic views of various images to be displayed as the outer images OLI, ORI. The various images to be displayed as the outer images OLI, ORI are described with reference to FIGS. 2, 6A and 6B.

The second switch 620 described with reference to FIG. 2 may be formed of switching elements. One of the switching elements may be operated to display an image indicating an instantaneous fuel consumption on one of the left and right regions 215, 216. Another of the switching elements may be operated to display an image indicating a travelable distance on one of the left and right regions 215, 216. Yet another of the switching elements may be operated to display an image indicating an average fuel consumption on one of the left and right regions 215, 216. Yet another of the switching elements may be operated to display an image indicating a traveling direction on one of the left and right regions 215, 216.

With regard to FIG. 6A, an image indicating an instantaneous fuel consumption is displayed in the left region 215 as the outer image OLI whereas an image indicating a travelable distance is displayed in the right region 216 as the outer image ORI. With regard to FIG. 6B, images indicating an average fuel consumption and an instantaneous fuel consumption are displayed in the left region 215 as the outer image OLI whereas images indicating a travelable distance and a traveling direction are displayed in the right region 216 as the outer image ORI.

An instantaneous fuel consumption, an average fuel consumption and a travelable distance are variables which change in correspondence to a state of the vehicle. These variables may be displayed as an image which indicates a meter (hereinafter also referred to as "meter image") or a numerical value (i.e. an image indicated by numerals). The meter image allows the driver to intuitively grasp a state of the vehicle. On the other hand, the meter image requires a large display area. An image indicating numerical values (hereinafter referred to as "numerical value image") does not require a large display area compared to the meter image. Further, the numerical value image allows the driver to accurately grasp a state of the vehicle. However, the numerical value image is not suitable for allowing the driver to grasp intuitive information. With regard to the present embodiment, the image of the variable is exemplified by at least one of images indicating the instantaneous fuel consumption, the average fuel consumption and the travelable distance shown in FIG. 6A and/or FIG. 6B When a lot of images are displayed as the outer images OLI, ORI, it is preferable that a numerical value image is used for informing the driver of variables, the numerical value image being displayed in a narrow display region. On the other hand, when a small number of images are displayed as the outer images OLI, ORI, it is preferable that a meter image is used for informing the driver of variables, the meter image being suitably used for giving intuitive information.

With regard to FIG. 6A, only an image indicating an instantaneous fuel consumption is displayed in the left region 215. Only an image indicating a travelable distance is displayed in the right region 216. Accordingly, the images indicating the instantaneous fuel consumption and the travelable distance are respectively displayed in the left and right regions 215, 216 as the meter images. This means that the signal generator 220 generates a second image signal for displaying information which indicates variables as a meter image when the signal generator 220 receives second switching signals from less than two switching elements used as the second switch 620.

With regard to FIG. 6B, not only an image indicating an instantaneous fuel consumption but also an image indicating an average fuel consumption are displayed in the left region 215. Accordingly, the images indicating an instantaneous fuel consumption and an average fuel consumption are respectively displayed in the left region 215 as numerical value images. Not only an image indicating a travelable distance but also an image indicating a traveling direction are displayed in the right region 216. The image indicating a travelable distance is displayed in the right region 216 as a numerical value image accompanied with a symbol image indicating a fuel supply apparatus. This means that the signal generator 220 generates a second image signal for displaying information indicating variables as numerical value images when the signal generator 220 receives second switching signals from more than three switching elements used as the second switch 620.

(Exemplary Arrangement of First Switch)

The first switch 610 is situated at a position so that the driver may access the first switch 610 without taking the hand off the steering wheel. Accordingly, the first switch 610 may be a steering switch mounted on the steering wheel. The first switch 610 formed as the steering switch is described below.

Figure 7:
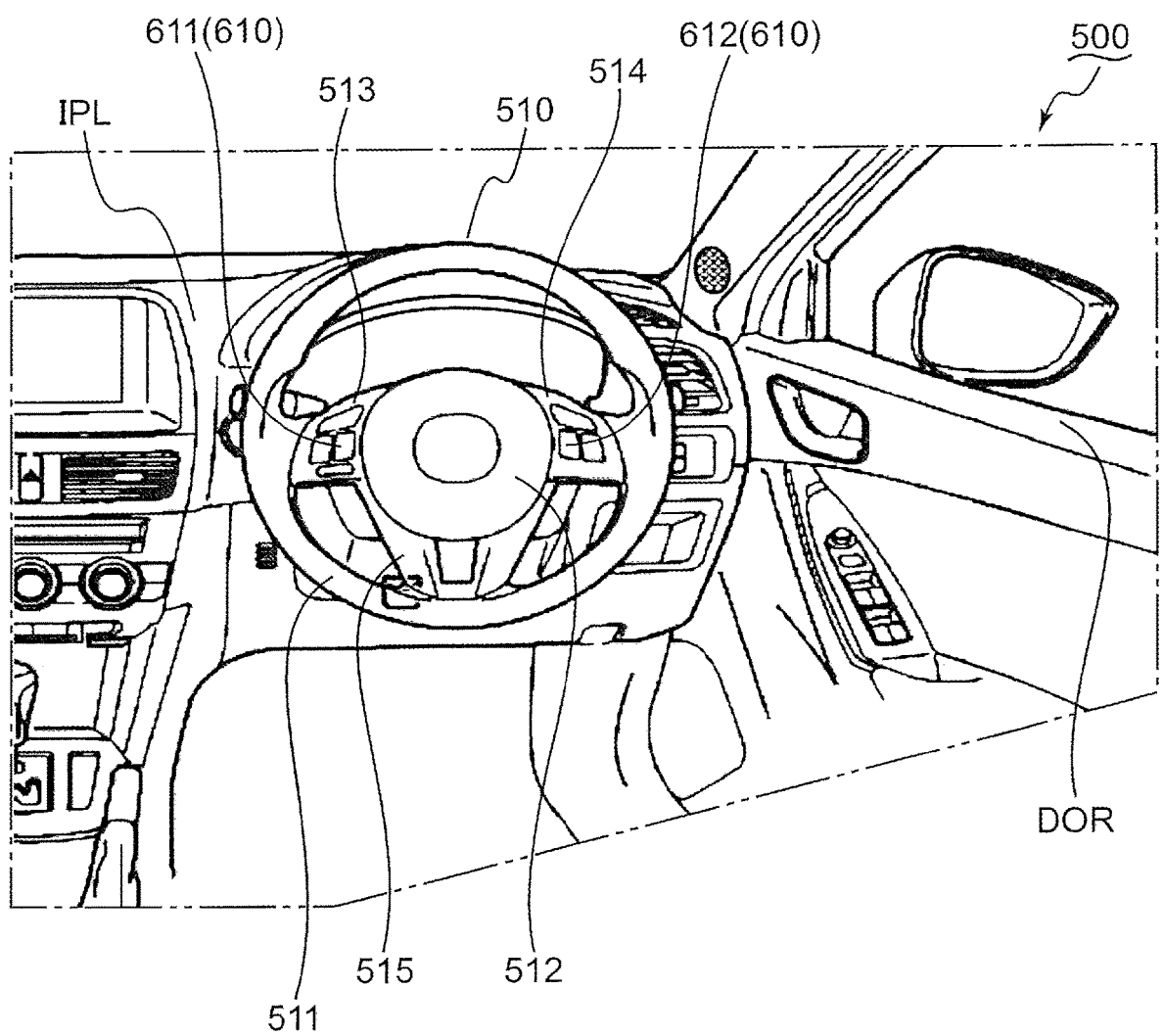
FIG. 7 is a schematic perspective view showing an interior of the vehicle of FIG. 2.

FIG. 7 is a schematic perspective view showing an interior of the vehicle 500. An exemplified arrangement of the first switch 610 is described with reference to FIGS. 2 to 4 and 7.

FIG. 7 shows the steering wheel 510. The vehicle 500 may run straight with the steering wheel 510 set at a rotational position shown in FIG. 7.

The steering wheel 510 includes a ring portion 511, a center portion 512, a left bridge portion 513, a right bridge portion 514 and lower bridge portions 515. The ring portion 511 is an annular member to be gripped by the driver. The center portion 512 is substantially concentric with the ring portion 511, and is surrounded by the ring portion 511. A steering shaft (not shown) connected to a steering mechanism (not shown) extends frontward from the center portion 512. The left bridge portion 513 extends leftward from the center portion 512, and is connected to the inner edge of the ring portion 511. The right bridge portion 514 extends rightward from the center portion 512, and is connected to the inner edge of the ring portion 511. The lower bridge portions 515 extend downward from the center portion 512, and are connected to the inner edge of the ring portion 511. Accordingly, the ring portion 511 is firmly connected to the center portion 512 by the left bridge portion 513, the right bridge portion 514 and the lower bridge portions 515.

The first switch 610 includes a left steering switch 611 and a right steering switch 612. When the driver operates the left steering switch 611, the signal generator 220 performs the processes shown in FIG. 4. When the driver repeatedly pushes the left steering switch 611, an image displayed as the inner image INI is switched in order of the steps shown in FIGS. 3A to 3D. On the other hand, when the driver repeatedly pushes the right steering switch 612, an image displayed as the inner image INI is switched in order of the steps shown in FIG. 3D to 3A.

FIG. 7 further shows an instrument panel IPL and a door DOR. The second switch 620 may be mounted on the instrument panel IPL or the door DOR.

Second Embodiment

According to the techniques described in the context of the first embodiment, the driver operates the first switch only when the driver wants desired information so that the inner image is temporarily displayed in the inner region. Accordingly, it is not necessary to display images as the inner image if the images has the same contents as the outer image. When the image having the same content as the outer image is excluded from candidates for an image which is displayed as the inner image, the driver may display a desired image as the inner image in the inner region without unnecessarily operating the first switch. Techniques which make the inner image different in contents from the outer image are described in the second embodiment.

Figure 8:
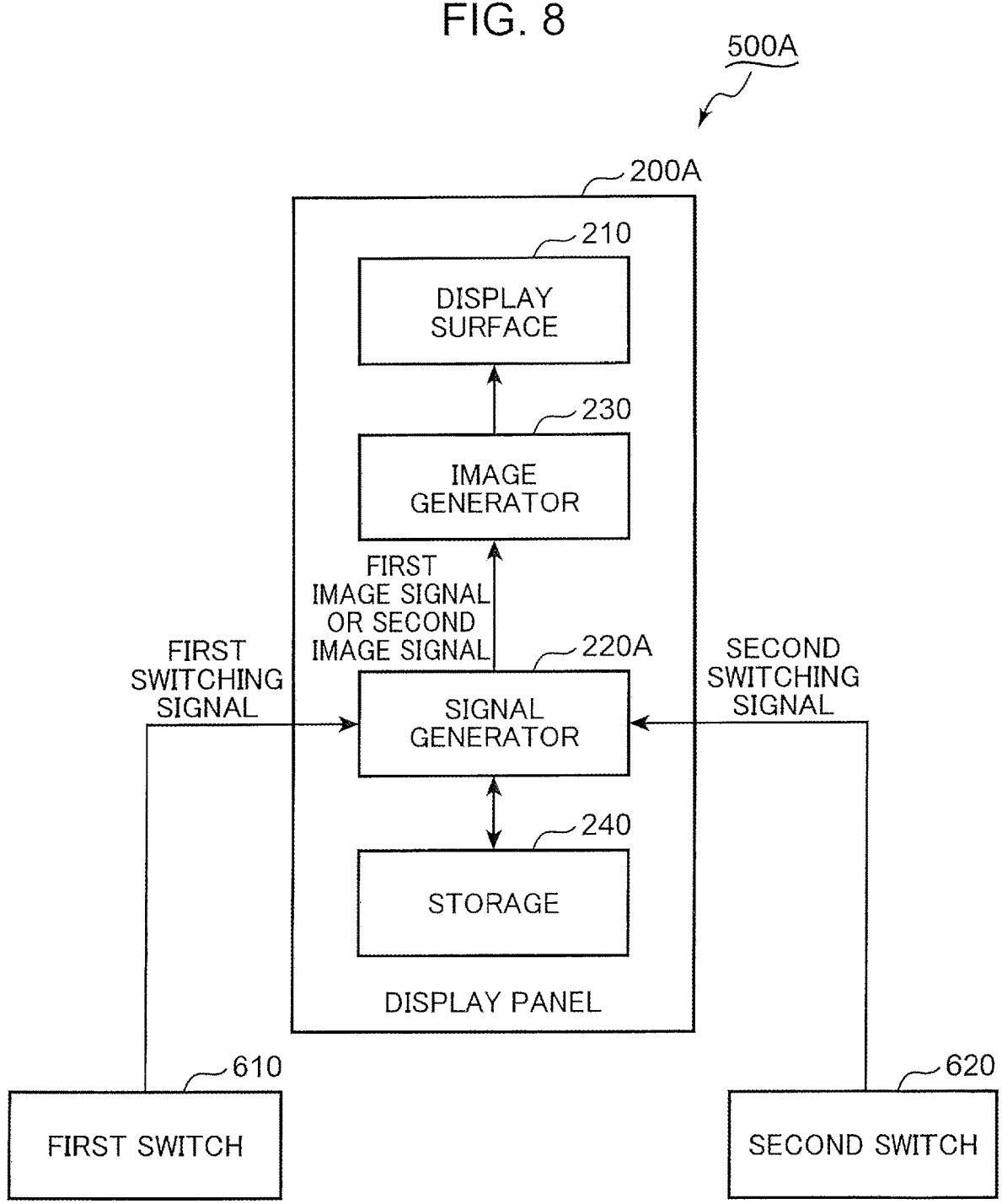
FIG. 8 is a schematic block diagram of a vehicle according to the second embodiment.

FIG. 8 is a schematic block diagram of a vehicle 500A according to the second embodiment. The vehicle 500A is described with reference to FIGS. 1 and 8. The description of the first embodiment is applicable to constitutional elements to which the same symbols are given as the first embodiment.

Like the first embodiment, the vehicle 500A includes the first and second switches 610, 620. The description of the first embodiment is applicable to these constitutional elements.

The vehicle 500A further includes a display panel 200A. Like the first embodiment, the display panel 200A includes the display surface 210 and the image generator 230. The ring frame 300 described with reference to FIG. 1 is overlaid to the display surface 210. The description of the first embodiment is applicable to the display surface 210, the image generator 230 and the ring frame 300.

The display panel 200A further includes a signal generator 220A and a storage 240. Like the first embodiment, the signal generator 220A generates a second image signal in response to a second switching signal outputted from the second switch 620. The second image signal is outputted from the signal generator 220A to the image generator 230. Accordingly, the outer images OLI, ORI (c.f. FIGS. 6A and 6B) are displayed on the display surface 210. The description of the first embodiment is applicable to the display of the outer images OLI, ORI.

FIG. 9 is a conceptual view of data stored in the storage 240. The data stored in the storage 240 is described with reference to FIGS. 3A to 4, 6A, 6B, 8 and 9.

The storage 240 stores first data and second data. The first data shown in FIG. 9 contains "image information A1", "image information B1", "image information D1", "image information E1", "image information F1", "image information G1", "image information H1" and "image information I1". "Image information A1", "image information B1", "image information D1", "image information E1", "image information F1", "image information G1", "image information H1" and "image information I1" are used for generating the inner images INI shown in FIGS. 3A to 3D.

"Image information A1" is used for generating an image indicating a traveling distance. "Image information B1" is used for generating an image indicating an average fuel consumption. "Image information D1" is used for generating an image indicating a traveling direction. "Image information E1" is used for generating an image indicating a travelable distance. "Image information F1" is used for generating an image indicating whether or not there is a preceding vehicle as a target in an automatic cruising control. "Image information G1" is used for generating an image indicating a set vehicle speed which is set in the automatic cruising control. "Image information H1" is used for generating an image indicating a period until a point of time when an inspection of the vehicle is required. "Image information I1" is used for generating an image indicating how long traveling distance is left for the inspection of the vehicle 500A. These images may be selected as the inner images INI as described with reference to FIGS. 3A to 3D. Accordingly, the first candidate images are exemplified by these images.

When the driver operates the first switch 610, the first switching signal is transmitted from the first switch 610 to the signal generator 220A. The signal generator 220A performs the processes described with reference to FIG. 4 in response to the first switching signal. When the signal generator 220A performs step S104 shown in FIG. 4, the signal generator 220A reads out "image information A1" and "image information B1" from the storage 240. The signal generator 220A generates a first image signal for generating the inner image INI shown in FIG. 3A on the basis of "image information A1" and "image information B1". When the signal generator 220A performs step S121 in FIG. 4, the signal generator 220A reads out "image information D1" and "image information E1" from the storage 240, and generates a first image signal to change the inner image INI shown in FIG. 3A to the inner image INI shown in FIG. 3B. When the signal generator 220A performs step S134 in FIG. 4, the signal generator 220A reads out "image information F1" and "image information G1" from the storage 240, and generates a first image signal to change the inner image INI shown in FIG. 3B to the inner image INI shown in FIG. 3C. When the signal generator 220A performs step S147 in FIG. 4, the signal generator 220A reads out "image information H1" and "image information I1" from the storage 240, and generates a first image signal to change the inner image INI shown in FIG. 3C to the inner image INI shown in FIG. 3D.

The second data (i.e. "image information B2", "image information C2", "image information D2" and "image information B2") shown in FIG. 9 is used for generating the outer images OLI, ORI shown in FIGS. 6A and 6B.

"Image information B2" is used for generating an image indicating an average fuel consumption. "Image information C2" is used for generating an image indicating an instantaneous fuel consumption. "Image information D2" is used for generating an image indicating a traveling direction. "Image information E2 is used for generating an image indicating a travelable distance. As described with reference to FIGS. 6A and 6B, these images may be selected as the outer images OLI, ORI. Accordingly, the second candidate images are exemplified by these images.

When the driver operates the second switch 620 to request displaying images which indicate an instantaneous fuel consumption and a travelable distance, the signal generator 220A reads out "image information C2" and "image information E2" from the storage 240. The signal generator 220A generates a second image signal for generating the outer images OLI, ORI shown in FIG. 6A on the basis of "image information C2" and "image information E2". When the driver operates the second switch 620 to request displaying images which indicate an average fuel consumption, an instantaneous fuel consumption, a travelable distance and a traveling direction, the signal generator 220A reads out "image information B2", "image information C2", "image information D2" and "image information E2" from the storage 240. The signal generator 220A refers to "image information B2", "image information C2", "image information D2" and "image information E2", and generates a second image signal to change the outer images OLI, ORI shown in FIG. 6A to the outer images OLI, ORI shown in FIG. 6B.

An image generated on the basis of "image information B2" is different in display position and design from the image generated on the basis of "image information B1". However, information given to the driver by the image generated on the basis of "image information B2" is the same as information given to the driver by the image generated on the basis of "image information B1". Accordingly, when the image generated on the basis of "image information B2" is displayed, it is unnecessary to display the image generated on the basis of "image information B1". An image generated on the basis of "image information D2" is different in display position and design from the image generated on the basis of "image information D1". However, information given to the driver by the image generated on the basis of "image information D2" is the same as information given to the driver by the image generated on the basis of "image information D1". Accordingly, when the image generated on the basis of "image information D2" is displayed, it is unnecessary to display the image generated on the basis of "image information D1". An image generated on the basis of "image information E2" is different in display position and design from the image generated on the basis of "image information E1". However, information given to the driver by the image generated on the basis of "image information E2" is the same as information conveyed to the driver by the image generated on the basis of "image information E1". Accordingly, when the image generated on the basis of "image information E2" is displayed, it is unnecessary to display the image generated on the basis of "image information E1". With regard to the present embodiment, the common image is exemplified by at least one of the images generated on the basis of "image information B2", "image information D2" and "image information E2".

The signal generator 220A processes signals to prevent an image having the contents which are common to the contents indicated by outer images OLI, ORI from being displayed as the inner image INI. When the driver operates the second switch 620 to request displaying images which indicate a travelable distance and a traveling direction, the inner image INI shown FIG. 3B is not displayed even after the driver operates the first switch 610. Accordingly, it is possible to make the contents of the inner image INI different from the outer images OLI, ORI.

<Other Features>

A designer may apply various features to the aforementioned vehicle display apparatus. The principles of the vehicle display apparatus described in the context of the aforementioned embodiment is not at all limited by the following features.

(Signal Processes Performed by Signal Generator)

The signal generator 220A may perform various signal processes for making the contents of the inner images INI different from the contents of the outer images OLI, ORI. Exemplary signal processes performed by the signal generator 220A are described below.

Figure 10:
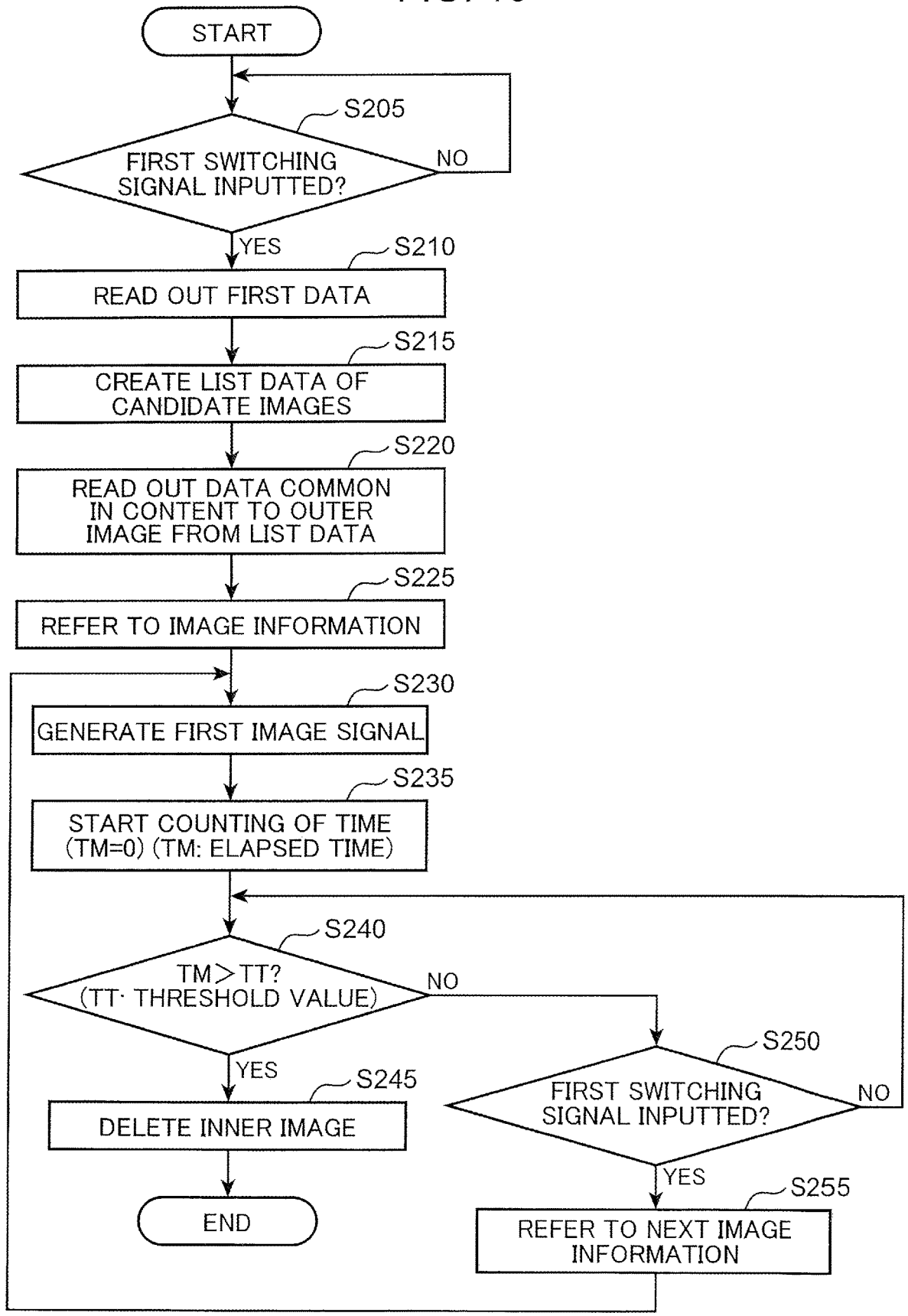
FIG. 10 is a schematic flowchart showing processes performed by a signal generator of the vehicle shown in FIG. 8 upon reception of a first switching signal.

FIG. 10 is a schematic flowchart showing processes performed by the signal generator 220A which has received a first switching signal. The processes performed by the signal generator 220A is described with reference to FIGS. 6B, 8 to 10.

(Step S205)

The signal generator 220A waits for a first switching signal. When the signal generator 220A receives the first switching signal from the first switch 610, step S210 is performed.

(Step S210)

The signal generator 220A reads out the first data from the storage 240. Then, step S215 is performed.

(Step S215)

The signal generator 220A creates list data including "image information A1", "image information B1", "image information D1", "image information E1", "image information F1", "image information G1", "image information H1" and "image information I1". Then, step S220 is performed.

(Step S220)

The signal generator 220A stores the outer images OLI, ORI selected by an operation of the second switch 620 before step S205 is performed. The signal generator 220A deletes image information which is common in contents to the stored outer images OLI, ORI from the list data created in step S215. When the outer images OLI, ORI described with reference to FIG. 6B are selected before step S205 is performed. "Image information B1", "image information D1", and "image information E1" are deleted from list data. Accordingly, the list data contains "image information A1", "image information F1", "image information G1", "image information H1" and "image information I1". Then, step S225 is performed.

(Step S225)

The signal generator 220A refers to image information contained in the list data (one or two of "image information A1", "image information F1", "image information G1", "image information H1" and "image information I1" when the outer images OLI, ORI described with reference to FIG. 6B are selected before step S205 is performed). Then, step S230 is performed.

(Step S230)

The signal generator 220A generates a first image signal on the basis of the referred image information. Accordingly, an inner image (not shown) in correspondence to the referred image information is displayed on the display surface 210. Then, step S235 is performed.

(Step S235)

The signal generator 220A starts counting of time (elapsed time "Tm"=0). Then, step S240 is performed.

(Step S240)

The signal generator 220A compares an elapsed time "Tm" from step S235 with the threshold value "Tt". When the elapsed time "Tm" exceeds the threshold value "Tt", step S245 is performed. Otherwise, step S250 is performed.

(Step S245)

The signal generator 220A generates an image signal to delete the inner image (not shown) from the center region 217, and finishes the signal processes for displaying the inner image.

(Step S250)

When the signal generator 220A receives the first switching signal again, step S255 is performed. Otherwise, step S240 is performed.

(Step S255)

The signal generator 220A refers to next image information contained in the list data (one or two of "image information A1", "image information F1", "image information G1", "image information H1", and "image information I1" when the outer images OLI, ORI described with reference to FIG. 6B are selected before step S205 is performed). Then, step S230 is performed.

Third Embodiment

Candidate images which are displayed as the inner images may be selected by the driver. Techniques which allow the driver to select candidate images to be displayed as the inner images are described in the third embodiment.

Figure 11:
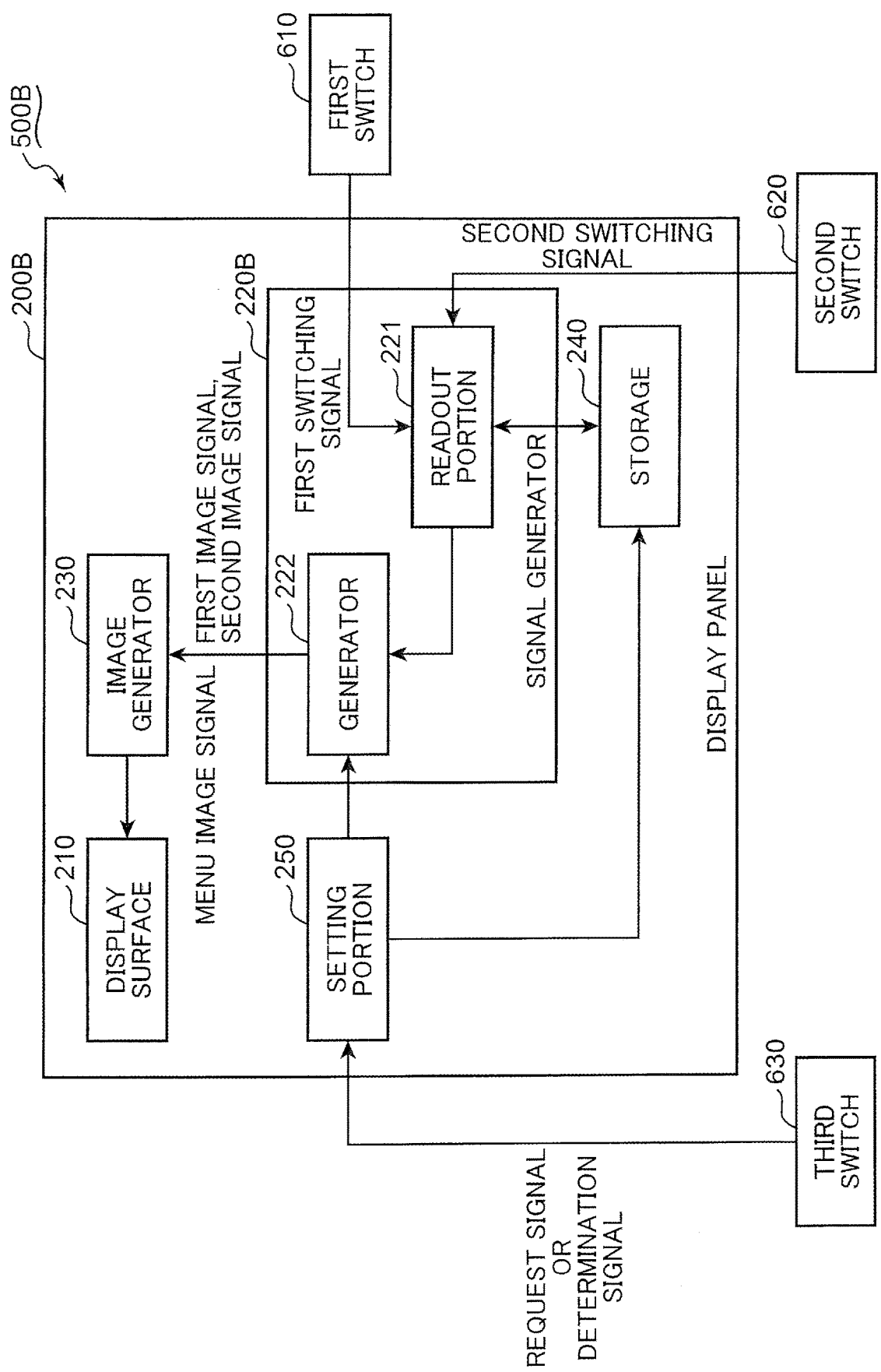
FIG. 11 is a schematic block diagram of a vehicle according to the third embodiment.

FIG. 11 is a schematic block diagram of a vehicle 500B according to the third embodiment. The vehicle 500B is described with reference to FIGS. 1, 9 and 11. The description of the aforementioned embodiments is applicable to constitutional elements to which the same symbols are given as the aforementioned embodiments.

Like the first embodiment, the vehicle 500B includes the first and second switches 610, 620. The description of the first embodiment is applicable to these constitutional elements.

The vehicle 500B also includes a display panel 200B and a third switch 630. Like the first embodiment, the display panel 200B includes the display surface 210 and the image generator 230. The ring frame 300 described with reference to FIG. 1 is overlaid to the display surface 210. The description of the first embodiment is applicable to the display surface 210, the image generator 230 and the ring frame 300.

Like the second embodiment, the display panel 200B includes a storage 240. The description of the second embodiment is applied to the storage 240.

The display panel 200B further includes a signal generator 220B and a setting portion 250. When the driver operates the third switch 630, the third switch 630 generates a request signal which requests setting of candidate images to be displayed as the inner images INI. The request signal is outputted from the third switch 630 to the setting portion 250. The setting portion 250 notifies the signal generator 220B of the reception of the request signal.

The signal generator 220B includes a readout portion 221 and a generator 222. The readout portion 221 reads out the first data (c.f. FIG. 9) and the second data (c.f. FIG. 9) from the storage 240 in response to first and second switching signals from the first and second switches 610, 620. The read-out first data and second data are outputted from the readout portion 221 to the generator 222. The generator 222 generates a first image signal on the basis of the first data. The generator 222 generates a second image signal on the basis of the second data. The first and second image signals are outputted from the generator 222 to the image generator 230. The image generator 230 generates the inner image INI and the outer images OLI, ORI respectively in response to the first and second image signals. The inner image INI and the outer images OLI, ORI are displayed on the display surface 210.

The generator 222 which has received notification of reception of a request signal from the setting portion 250 generates a menu image signal for displaying the selection menu image on the display surface 210. The selection menu image allows the driver to select candidate images to be displayed as the inner image INI. The menu image signal is outputted from the generator 222 to the image generator 230. The image generator 230 generates the selection menu image in response to the menu image signal. The selection menu image is displayed on the display surface 210.

Figure 12:
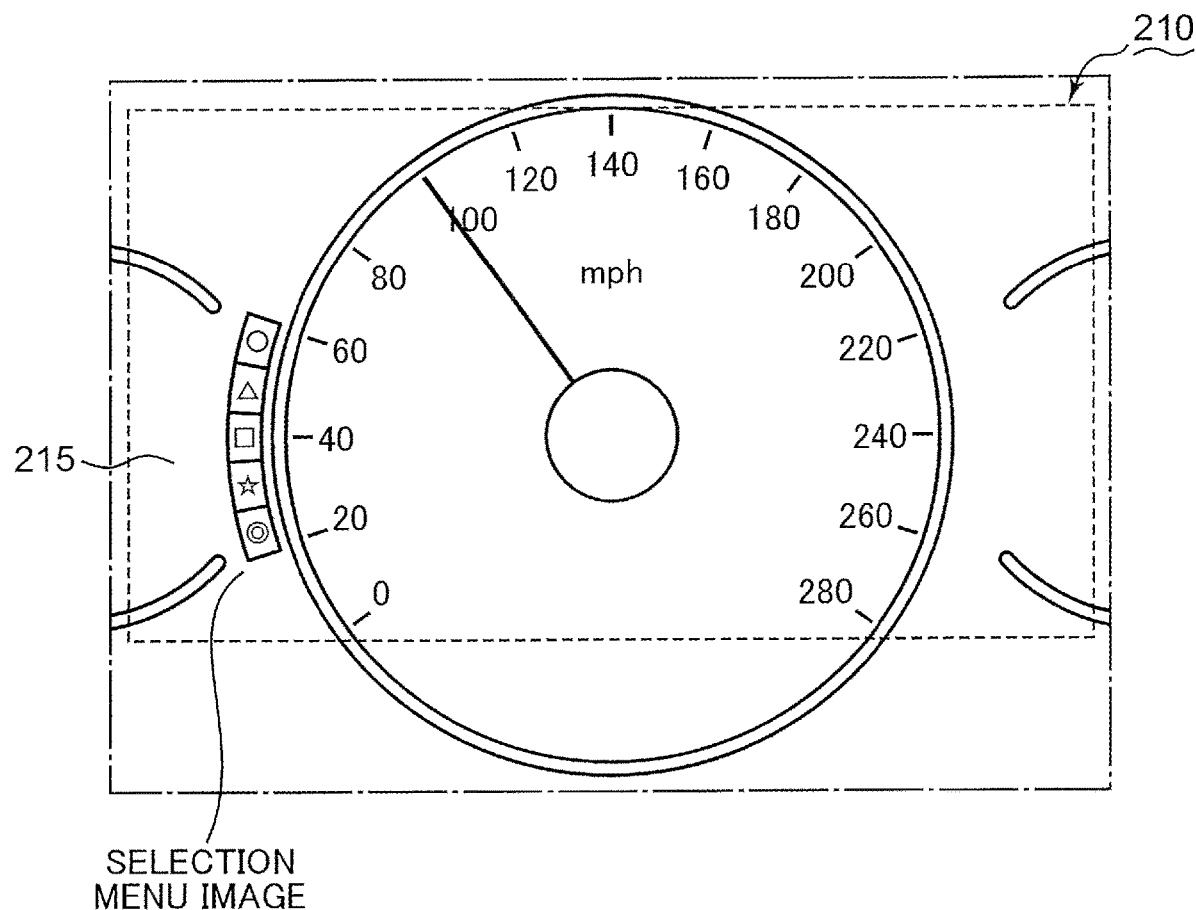
FIG. 12 is a schematic front view of a display surface of the vehicle of FIG. 11.

FIG. 12 is a schematic front view of the display surface 210 on which the selection menu image is displayed. The selection menu image is described with reference to FIGS. 9, 11 and 12.

The selection menu image includes thumbnail images. FIG. 12 shows the thumbnail images as symbols, i.e., a circle, a triangle, a square, a star and a duplicate circle. The selection menu image is displayed in the left region 215. The selection menu image is an arcuate strip image extending along an outer edge of the ring frame 300. However, the selection menu image may have other designs or may be displayed at another position. Accordingly, the principles of the present embodiment are not limited to a particular design and a particular display position of the selection menu image.

The thumbnail images correspond to images contained in the first data and the second data which are described in the context of the second embodiment (i.e. images indicating a traveling distance, an average fuel consumption, an instantaneous fuel consumption, a traveling direction, a travelable distance, an image indicating whether or not there is a preceding vehicle as a target under an automatic cruising control, an image indicating a set vehicle speed which is set in the automatic cruising control, an image indicating a period until a point of time when an inspection of the vehicle is required, and an image indicating how long traveling distance is left for the inspection of the vehicle 500B). The driver may operate the third switch 630 to select some thumbnail images as the selected thumbnail images from the thumbnail images of the selection menu image displayed on the display surface 210. The third switch 630 generates a determination signal indicating the selected thumbnail images. The determination signal is outputted from the third switch 630 to the setting portion 250. The setting portion 250 makes the storage 240 store image information in correspondence to the selected thumbnail images as the first data. FIG. 9 indicates that the driver selects the thumbnail images in correspondence to images indicating a traveling distance, an average fuel consumption, a traveling direction, a travelable distance, an image indicating whether or not there is a preceding vehicle as a target under an automatic cruising control, an image indicating a set vehicle speed which is set in the automatic cruising control, an image indicating a period until a point of time when an inspection of the vehicle is required, and an image indicating how long traveling distance is left for the inspection of the vehicle 500B.

Figure 13:
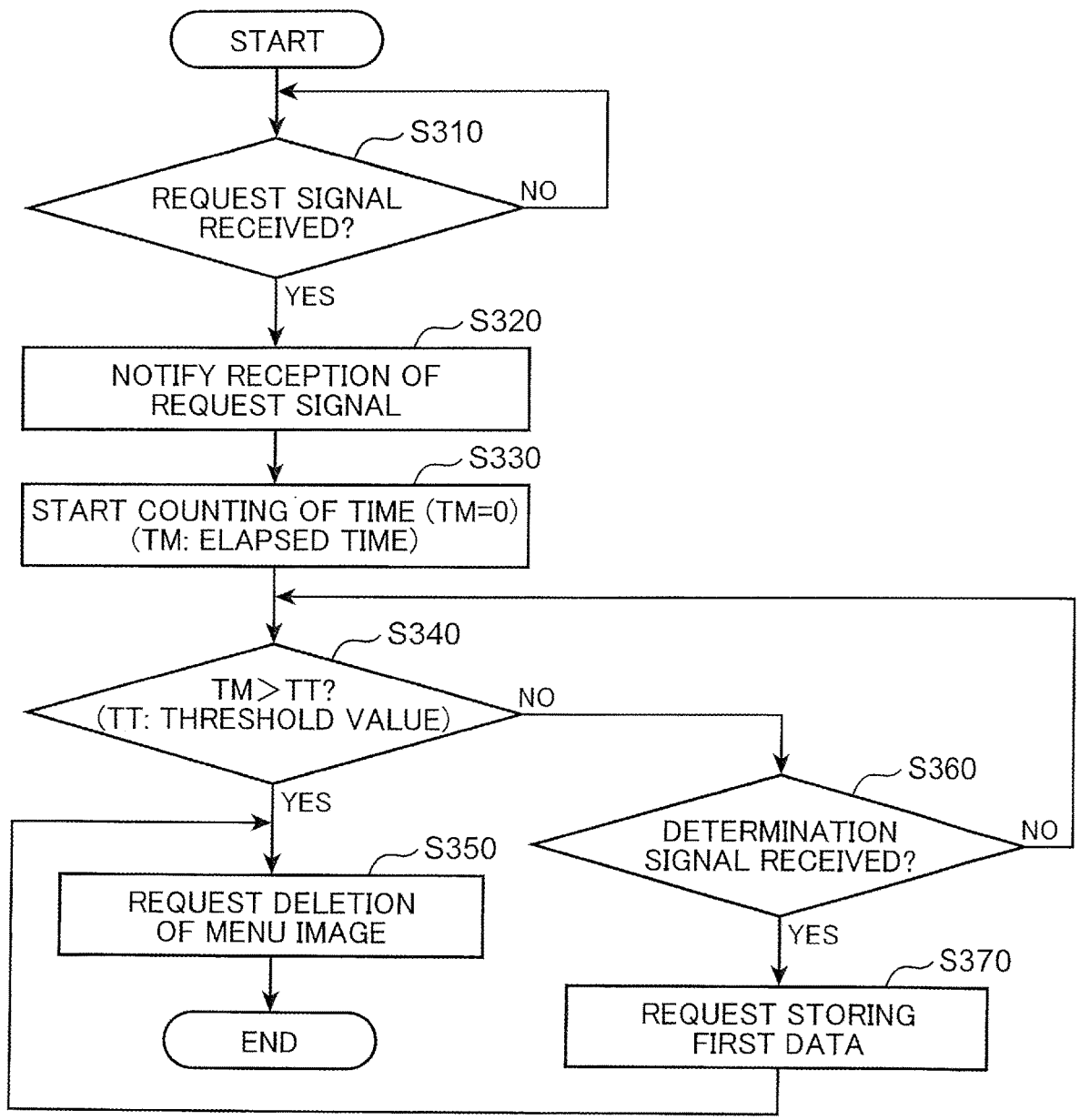
FIG. 13 is a schematic flow chart showing exemplary signal processes performed by a setting portion of the vehicle of FIG. 11.

FIG. 13 is a schematic flowchart showing exemplary signal processes performed by the setting portion 250. The signal processes performed by the setting portion 250 is described with reference to FIGS. 11 to 13.

(Step S310)
The setting portion 250 waits for a request signal. The setting portion 250 performs step S320 upon reception of the request signal.

(Step S320)
The setting portion 250 notifies the generator 222 of the reception of the request signal. The generator 222 generates a menu image signal in response to notification from the setting portion 250. The menu image signal is outputted from the generator 222 to the image generator 230. The image generator 230 generates the selection menu image described with reference to FIG. 12 in response to the menu image signal. The selection menu image is displayed on the display surface 210.

(Step S330)
The setting portion 250 starts counting of time (elapsed time "Tm"=0). Then, step S340 is performed.

(Step S340)
The setting portion 250 compares an elapsed time "Tm" from step S330 with the threshold value "Tt". When the elapsed time "Tm" exceeds the threshold value "Tt", step S350 is performed. Otherwise, step S360 is performed.

(Step S350)
The setting portion 250 requests the generator 222 to delete the selection menu image from the display surface 210. The generator 222 generates an image signal in response to the deletion request from the setting portion 250 so that the selection menu image is deleted from the display surface 210. Accordingly, the selection menu image is deleted from the display surface 210, and the first data setting processes are finished.

(Step S360)
The setting portion 250 determines whether or not a determination signal is received. The setting portion 250 performs step S370 when the determination signal is received. Otherwise, step S340 is performed.

(Step S370)
The setting portion 250 requests the storage 240 to store image information in correspondence to selected thumbnail images designated by the determination signal as the first data. In response to the request from the setting portion 250, the storage 240 stores the image information in correspondence to the selected thumbnail images designated by the determination signal as the first data.

The principles of the aforementioned various embodiments may be combined with each other or may be changed in conformity with requests made to a vehicle.

With regard to the aforementioned embodiment, the third switch 630 which is provided separately from the first and second switches 610, 620 is used for setting the first data. However, a switching element which is used as one of the first and second switches 610, 620 may be used for setting the first data. In this case, a waveform of a signal which the switching element outputs may be determined on the basis of an operation of the driver. The setting portion 250 may refer to the waveform of the signal to determine whether or not the received signal is any one of a request signal, a determination signal and a first switching signal (or a second switching signal).

The exemplary techniques described in the context of the aforementioned various embodiments mainly include the following features.

The vehicle display apparatus according to one aspect of the aforementioned embodiment includes: a vehicle display apparatus having: a display panel having a display surface on which an image is displayed; and an overlaid member overlaid on the display surface. The overlaid member partitions the display surface into an inner region which is at least partially surrounded by the overlaid member, and an outer region which is situated outside the overlaid member. The image contains an inner image displayed in the inner region and an outer image displayed in the outer region. The display panel includes a signal generator configured to generate a first image signal for changing a content of the inner image displayed in the inner region in response to a first switching signal outputted from a first switch. The signal generator generates a second image signal for changing a content of the outer image displayed in the outer region in response to a second switching signal outputted from a second switch which is more distant from a steering wheel than the first switch.

According to the aforementioned configuration, the overlaid member partitions the display surface into an inner region which is at least partially surrounded by the overlaid member, and an outer region which is situated outside the overlaid member. Accordingly, a user may visually distinguish the inner image displayed in the inner region from the outer image displayed in the outer region. Since the inner selected image is less likely to be integrally recognized with the outer image, the driver may accurately and easily understand each of information acquired from the inner image and information acquired from the outer image.

Since the first switch is closer to the steering wheel than the second switch, the drive may operate the first switch without taking the hand off the steering wheel. Accordingly, the driver may safely and frequently change contents of the inner image. Consequently, the driver may receive a variety of information from the inner image displayed in the inner region. Since candidate images to be displayed as the inner image may be limited to images for which frequent changes are required, the driver may operate the first switch to select a desired image from a small number of candidate images. Accordingly, the driver may operate the first switch to display the desired images in the inner region.

Since the second switch is more distant from the steering wheel than the first switch, it is preferable that the outer image has contents for which frequent changes are not required. However, the driver may receive a variety of information from outer images displayed in the outer region since contents of the outer images may be changed in response to a second switching signal. The candidate images to be displayed as the outer image may be limited to images for which frequent changes are not required. Therefore, the driver may operate the second switch to select a desired image from a small number of candidate images. Accordingly, the driver may operate the second switch in a short period to display the desired images in the outer region.

As described above, the driver may operate the first and second switches to display desired images in the inner and outer regions. Accordingly, unlike the prior art, the driver does not have to memorize complicated gestures. Accordingly, the driver may display desired images on the display surface with a simple operation. In addition, the operation of the first and second switches may transmit a request of the driver to the display panel without requiring sensors for detecting gestures of the driver unlike the prior art. Accordingly, it is possible to manufacture a vehicle display apparatus at a low cost.

With regard to the aforementioned configuration, the inner image displayed in the inner region may be different in contents from the outer image displayed in the outer region.

According to the aforementioned configuration, since the inner image displayed in the inner region is different in contents from the outer image displayed in the outer region, the driver may receive a variety of information from the inner and outer images.

With regard to the aforementioned configuration, the display panel may include a storage configured to store first data indicating first candidate images which are selectable as the inner image and second data indicating second candidate images which are selectable as the outer image. The signal generator may generate the first image signal so that the inner image is switched from one of the first candidate images to another of the first candidate images in response to reception of the first switching signal. The signal generator may generate the second image signal so that the outer image is switched from one of the second candidate images to another of the second candidate images in response to reception of the second switching signal.

According to the aforementioned configuration, the signal generator generates the first image signal so that the inner image is switched from one of the first candidate images to another of the first candidate images in response to reception of the first switching signal. Accordingly, the driver may operate the first switch to select an inner image from the first candidate images, the inner image being displayed in the inner region. Since the first switch is closer to the steering wheel than the second switch, the driver may operate the first switch without taking the hand off the steering wheel. Accordingly, the driver may safely and frequently change the inner image from one to another of the first candidate images. The first candidate images to be displayed as the inner image may be limited to images for which frequent changes are required. Accordingly, there may be a small number of first candidate images. The driver may operate the first switch to select a desired image from a small number of first candidate images. Accordingly, it may take short that the driver operates the first switch to display the desired images in the inner region.

The signal generator generates the second image signal so that the outer image is switched from one of the second candidate images to another of the second candidate images in response to reception of the second switching signal. Accordingly, the driver may operate the second switch to select an outer image from the second candidate images, the outer image being displayed in the outer region. Since the second switch is more distant from the steering wheel than the first switch, it is preferable that the outer image has contents for which frequent changes are not required. The second candidate images to be displayed as the outer image may be limited to images for which frequent changes are not required. Accordingly, the driver may operate the second switch to select a desired image from a small number of second candidate images. Therefore, it may take short that the driver operates the second switch to display the desired images in the outer region.

With regard to the aforementioned configuration, the second candidate images may include a common image which is common in contents to one of the first candidate images. When the common image is displayed in the outer region as the outer image, the signal generator may exclude data indicating the common image from the first data read out from the storage in generating the first image signal.

According to the aforementioned configuration, if the common image is displayed in the outer region as the outer image, the signal generator excludes data indicating the common image from the first data read out from the storage to generate the first image signal. Accordingly, the driver may operate the first switch to select a desired image from a small number of first candidate images. Accordingly, it may take short that the driver operates the first switch to display the desired images in the inner region.

With regard to the aforementioned configuration, the display panel may include a setting portion for setting the first candidate images from images contained in the first data and the second data. The setting portion may make the signal generator generate a menu image signal for displaying a selection menu image containing thumbnail images in correspondence to the images on the display surface upon reception of a request signal for requesting setting of the first candidate images. Upon reception of a determination signal indicating selected thumbnail images which have been selected from the thumbnail images, the setting portion may make the storage store selected images respectively in correspondence to the selected thumbnail images as the first candidate images.

According to the aforementioned configuration, the display panel includes the setting portion for setting first candidate images from images contained in the first data and the second data. Accordingly, the driver may select an image from the images, frequent changes being required for the selected image. Accordingly, the first candidate images may contain images suitable for a driving style of the driver.

Upon reception of a request signal for requesting setting of the first candidate images, the setting portion makes the signal generator generate a menu image signal for displaying a selection menu image containing thumbnail images in correspondence to the images on the display surface. Accordingly, the driver may view at a glance the thumbnail images on the display surface. Therefore, the driver may easily set the first candidate images.

Upon reception of the determination signal indicating the selected thumbnail images which have been selected from the thumbnail images, the setting portion makes the storage store selected images respectively in correspondence to the selected thumbnail images as the first candidate images. Accordingly, setting of the first candidate images is held by the storage. Therefore, the driver may not frequently set the first candidate images.

With regard to the aforementioned configuration, the second candidate images may include an image of a variable selectively displayed as a meter image indicating a predetermined variable as a meter or a numerical value image indicating the variable as a numerical value. The signal generator may generate the second image signal so that the meter image is displayed when images displayed as the outer image together with the image of the variable are less than a predetermined number. The signal generator may generate the second image signal so that the numerical value image is displayed when images displayed as the outer image together with the image of the variable are no less than the predetermined number.

According to the aforementioned configuration, the meter image indicates the predetermined variable as a meter. Since the meter image is displayed, the driver may intuitively grasp the variable. The meter image requires a display region wider than a display region necessary for displaying a numerical value image indicating a variable as a numerical value for appropriately giving information to the driver. If images displayed as the outer image together with the image of the variable is less than the predetermined number, the signal generator generates the second image signal so that the meter image is displayed. Accordingly, the meter image may be displayed in a sufficiently wide region.

Since a numerical value image indicates a variable as a numerical value, a driver may accurately grasp the variable when the numerical value image is displayed. Even when a numerical value image is displayed in a display region narrower than a display region in which a meter image is displayed, the numerical value image may appropriately give information to the driver. Accordingly, a lot of images may be displayed in the form of numerical value images as the outer image.

A vehicle according to another aspect of the aforementioned embodiment includes the aforementioned vehicle display apparatus.

With regard to the aforementioned configuration, since the vehicle includes the aforementioned vehicle display apparatus, the driver may operate the first and second switches to display desired images in the inner and outer regions. Accordingly, unlike the prior art, the driver does not have to memorize complicated gestures. In short, the driver may display a desired image on the display surface with a simple operation. In addition, the operation of the first and second switches may give a request of the driver to a display panel without requiring sensors for detecting gestures of the driver unlike the prior art. Accordingly, it is possible to manufacture a vehicle at a low cost.

With regard to the aforementioned configuration, the first switch may be a steering switch mounted on the steering wheel. The second switch may be mounted on a part other than the steering wheel.

According to the aforementioned configuration, since the first switch is a steering switch mounted on the steering wheel, the driver may operate the first switch without taking the hand off the steering wheel. Accordingly, the driver may safely and frequently change the content of the inner image. Therefore, the driver may receive a variety of information from the inner image displayed in the inner region. The candidate images to be displayed as the inner image may be limited to images for which frequent changes are required. Accordingly, the driver may operate the first switch to select a desired image from a small number of candidate images. Consequently, it may take short that the driver operates the first switch to display a desired image in the inner region. Since the second switch is mounted on a part other than the steering wheel, a designer designing a vehicle may arrange the second switch in conformity with a design of the vehicle.

INDUSTRIAL APPLICABILITY

The principles of the aforementioned embodiments may be suitably used in designing various vehicles.

The invention claimed is:
1. A vehicle display apparatus comprising:
a display panel having a display surface on which an image is displayed; and
an overlaid member overlaid on the display surface,
wherein the overlaid member partitions the display surface into an inner region which is at least partially surrounded by the overlaid member, and an outer region which is situated outside the overlaid member,
wherein the image contains an inner image displayed in the inner region and an outer image displayed in the outer region,
wherein the display panel includes a signal generator configured to generate a first image signal for changing a content of the inner image displayed in the inner region in response to a first switching signal outputted from a first switch,
wherein the signal generator generates a second image signal for changing a content of the outer image displayed in the outer region in response to a second switching signal outputted from a second switch situated which is more distant from a steering wheel than the first switch, and
wherein the display panel includes:
a storage configured to store first data indicating first candidate images which are selectable as the inner image and second data indicating second candidate images which are selectable as the outer image, the second candidate images including a common image which is common in content to one of the first candidate images, and
a setting portion for setting the first candidate images from images contained in the first data and the second data, the setting portion being configured to make the signal generator generate a menu image signal for displaying a selection menu image containing thumbnail images in correspondence to images contained in the first data and the second data, upon reception of a request signal for requesting setting of the first candidate images.

2. The vehicle display apparatus according to claim 1, wherein the inner image displayed in the inner region is different in content from the outer image displayed in the outer region.

3. The vehicle display apparatus according to claim 2, wherein the signal generator generates the first image signal so that the inner image is switched from one of the first candidate images to another of the first candidate images in response to reception of the first switching signal, and wherein the signal generator generates the second image signal so that the outer image is switched from one of the second candidate images to another of the second candidate images in response to reception of the second switching signal.

4. The vehicle display apparatus according to claim 3, wherein when the common image is displayed in the outer region as the outer image, the signal generator excludes data indicating the common image from the first data read out from the storage in generating the first image signal.

5. The vehicle display apparatus according to claim 1, wherein the signal generator generates the first image signal so that the inner image is switched from one of the first candidate images to another of the first candidate images in response to reception of the first switching signal, and wherein the signal generator generates the second image signal so that the outer image is switched from one of the second candidate images to another of the second candidate images in response to reception of the second switching signal.

6. The vehicle display apparatus according to claim 5, wherein when the common image is displayed in the outer region as the outer image, the signal generator excludes data indicating the common image from the first data read out from the storage in generating the first image signal.

7. The vehicle display apparatus according to claim 5, wherein upon reception of a determination signal indicating selected thumbnail images which have been selected from the thumbnail images, the setting portion makes the storage store selected images respectively in correspondence to the selected thumbnail images as the first candidate images.

8. The vehicle display apparatus according to claim 7, wherein the second candidate images include an image of a variable selectively displayed as a meter image indicating a predetermined variable as a meter or a numerical value image indicating the variable as a numerical value, wherein the signal generator generates the second image signal so that the meter image is displayed when images displayed as the outer image together with the image of the variable are less than a predetermined number, and wherein the signal generator generates the second image signal so that the numerical value image is displayed when images displayed as the outer image together with the image of the variable are no less than the predetermined number.

9. A vehicle comprising the vehicle display apparatus according to claim 8.

10. The vehicle display apparatus according to claim 5, wherein the second candidate images include an image of a variable selectively displayed as a meter image indicating a predetermined variable as a meter or a numerical value image indicating the variable as a numerical value, wherein the signal generator generates the second image signal so that the meter image is displayed when images displayed as the outer image together with the image of the variable are less than a predetermined number, and wherein the signal generator generates the second image signal so that the numerical value image is displayed when images displayed as the outer image together with the image of the variable are no less than the predetermined number.

11. A vehicle comprising the vehicle display apparatus according to claim 1.

12. A vehicle display apparatus comprising:

a display panel having a display surface on which an image is displayed; and an overlaid member overlaid on the display surface to partition the display surface into an inner region which is at least partially surrounded by the overlaid member, and an outer region which is situated outside the overlaid member, wherein the image contains an inner image displayed in the inner region and an outer image displayed in the outer region, the inner image being different in content from the outer image, wherein the display panel includes:

a signal generator configured to generate a first image signal for changing a content of the inner image displayed in the inner region in response to a first switching signal outputted from a first switch, a second image signal for changing a content of the outer image displayed in the outer region in response to a second switching signal outputted from a second switch which is more distant from a steering wheel than the first switch, and a menu image signal for displaying a selection menu image containing thumbnail images in correspondence to images on the display surface, a storage configured to store first data indicating first candidate images which are selectable as the inner image and second data indicating second candidate images which are selectable as the outer image, the second candidate images including a common image which is common in content to one of the first candidate images, and a setting portion for setting the first candidate images from images contained in the first data and the second data, the setting portion being configured to make the signal generator generate the menu image signal upon reception of a request signal for requesting setting of the first candidate images, wherein the signal generator generates the first image signal so that the inner image is switched from one of the first candidate images to another of the first candidate images in response to reception of the first switching signal, and generates the second image signal so that the outer image is switched from one of the second candidate images to another of the second candidate images in response to reception of the second switching signal, wherein when the common image is displayed in the outer region as the outer image, the signal generator excludes data indicating the common image from the first data read out from the storage in generating the first image signal, and wherein upon reception of a determination signal indicating selected thumbnail images which have been selected from the thumbnail images, the setting portion makes the storage store selected images respectively in correspondence to the selected thumbnail images as the first candidate images.

13. The vehicle display apparatus according to claim 12,
wherein the second candidate images include an image of a variable selectively displayed as a meter image indicating a predetermined variable as a meter or a numerical value image indicating the variable as a numerical value, wherein the signal generator generates the second image signal so that the meter image is displayed when images displayed as the outer image together with the image of the variable are less than a predetermined number, and wherein the signal generator generates the second image signal so that the numerical value image is displayed when images displayed as the outer image together with the image of the variable are no less than the predetermined number.

14. A vehicle comprising the vehicle display apparatus according to claim 13.

15. The vehicle according to claim 14,
wherein the first switch is a steering switch mounted on the steering wheel, and
wherein the second switch is mounted on a part other than the steering wheel.

16. A vehicle display apparatus comprising:
a display panel having a display surface on which an image is displayed; and
an overlaid member overlaid on the display surface to partition the display surface into an inner region which is at least partially surrounded by the overlaid member, and an outer region which is situated outside the overlaid member,
wherein the image contains an inner image displayed in the inner region and an outer image displayed in the outer region,
wherein the display panel includes:
a signal generator configured to generate a first image signal for changing a content of the inner image displayed in the inner region in response to a first switching signal outputted from a first switch, a second image signal for changing a content of the outer image displayed in the outer region in response to a second switching signal outputted from a second switch which is more distant from a steering wheel than the first switch, and a menu image signal for displaying a selection menu image containing thumbnail images in correspondence to images on the display surface, a storage configured to store first data indicating first candidate images which are selectable as the inner image and second data indicating second candidate images which are selectable as the outer image, the second candidate images including a common image which is common in content to one of the first candidate images, and a setting portion for setting the first candidate images from images contained in the first data and the second data, the setting portion being configured to make the signal generator generate the menu image signal upon reception of a request signal for requesting setting of the first candidate images, wherein the signal generator generates the first image signal so that the inner image is switched from one of the first candidate images to another of the first candidate images in response to reception of the first switching signal, and generates the second image signal so that the outer image is switched from one of the second candidate images to another of the second candidate images in response to reception of the second switching signal, wherein when the common image is displayed in the outer region as the outer image, the signal generator excludes data indicating the common image from the first data read out from the storage in generating the first image signal, and wherein upon reception of a determination signal indicating selected thumbnail images which have been selected from the thumbnail images, the setting portion makes the storage store selected images respectively in correspondence to the selected thumbnail images as the first candidate images.

17. The vehicle display apparatus according to claim 16,
wherein the second candidate images include an image of a variable selectively displayed as a meter image indicating a predetermined variable as a meter or a numerical value image indicating the variable as a numerical value, wherein the signal generator generates the second image signal so that the meter image is displayed when images displayed as the outer image together with the image of the variable are less than a predetermined number, and wherein the signal generator generates the second image signal so that the numerical value image is displayed when images displayed as the outer image together with the image of the variable are no less than the predetermined number.

18. A vehicle comprising the vehicle display apparatus according to claim 17.

19. The vehicle according to claim 18,
wherein the first switch is a steering switch mounted on the steering wheel, and
wherein the second switch is mounted on a part other than the steering wheel.

* * * * *